US009955522B2

(12) United States Patent
Yang

(10) Patent No.: US 9,955,522 B2
(45) Date of Patent: Apr. 24, 2018

(54) WIFI ENABLE BASED ON CELL SIGNALS

(71) Applicant: Hand Held Products, Inc., Fort Mill, SC (US)

(72) Inventor: Shanning Yang, Suzhou (CN)

(73) Assignee: Hand Held Products, Inc., Fort Mill, SC (US)

( * ) Notice: Subject to any disclaimer, the term of this patent is extended or adjusted under 35 U.S.C. 154(b) by 250 days.

(21) Appl. No.: 14/804,904

(22) Filed: Jul. 21, 2015

(65) Prior Publication Data

US 2017/0013667 A1    Jan. 12, 2017

(30) Foreign Application Priority Data

Jul. 7, 2015    (CN) .......................... 2015 1 0392751

(51) Int. Cl.
| | | |
|---|---|---|
| *H04L 12/28* | (2006.01) | |
| *H04W 36/00* | (2009.01) | |
| *H04W 76/04* | (2009.01) | |
| *H04L 12/26* | (2006.01) | |
| *H04W 4/02* | (2018.01) | |
| *H04W 48/20* | (2009.01) | |
| *H04W 48/16* | (2009.01) | |

(Continued)

(52) U.S. Cl.
CPC ............. *H04W 76/04* (2013.01); *H04L 43/10* (2013.01); *H04W 4/02* (2013.01); *H04W 48/16* (2013.01); *H04W 48/20* (2013.01); *H04W 52/0229* (2013.01); *H04W 84/04* (2013.01); *Y02B 60/50* (2013.01)

(58) Field of Classification Search
CPC ........ H04W 4/04; H04W 48/20; H04W 64/00
See application file for complete search history.

(56) References Cited

U.S. PATENT DOCUMENTS

| | | | |
|---|---|---|---|
| 6,832,725 | B2 | 12/2004 | Gardiner et al. |
| 7,128,266 | B2 | 10/2006 | Marlton et al. |
| 7,159,783 | B2 | 1/2007 | Walczyk et al. |

(Continued)

FOREIGN PATENT DOCUMENTS

| | | |
|---|---|---|
| EP | 2083599 A2 | 7/2009 |
| WO | 2013163789 A1 | 11/2013 |

(Continued)

OTHER PUBLICATIONS

Combined Search and Examination Report in counterpart UK Application No. GB1609755.2 dated Nov. 24, 2016, pp. 1-6.

(Continued)

*Primary Examiner* — Melanie Jagannathan
(74) *Attorney, Agent, or Firm* — Additon, Higgins & Pendleton, P.A.

(57) ABSTRACT

A wireless device has a WiFi transceiver and a WWAN transceiver. A programmed processor is configured to connect the WiFi transceiver to an access point and while connected, operate in a learning mode in which WWAN signals are characterized at a location of the WiFi access point and stored as an access point characterization. When a connection to the AP is lost, operating in a monitoring mode in which WWAN signals are compared to the stored access point characterization with the WiFi transceiver disabled. When the WWAN signals match the WiFi AP characterization the WiFi transceiver is enabled to reconnect to a WiFi AP.

18 Claims, 4 Drawing Sheets

(51) Int. Cl.
*H04W 52/02* (2009.01)
*H04W 84/04* (2009.01)

(56) References Cited

U.S. PATENT DOCUMENTS

| | | | |
|---|---|---|---|
| 7,413,127 B2 | 8/2008 | Ehrhart et al. | |
| 7,726,575 B2 | 6/2010 | Wang et al. | |
| 8,155,081 B1* | 4/2012 | Mater | H04W 4/04 370/254 |
| 8,294,969 B2 | 10/2012 | Plesko | |
| 8,317,105 B2 | 11/2012 | Kotlarsky et al. | |
| 8,322,622 B2 | 12/2012 | Suzhou et al. | |
| 8,366,005 B2 | 2/2013 | Kotlarsky et al. | |
| 8,371,507 B2 | 2/2013 | Haggerty et al. | |
| 8,376,233 B2 | 2/2013 | Van Horn et al. | |
| 8,381,979 B2 | 2/2013 | Franz | |
| 8,390,909 B2 | 3/2013 | Plesko | |
| 8,408,464 B2 | 4/2013 | Zhu et al. | |
| 8,408,468 B2 | 4/2013 | Horn et al. | |
| 8,408,469 B2 | 4/2013 | Good | |
| 8,424,768 B2 | 4/2013 | Rueblinger et al. | |
| 8,448,863 B2 | 5/2013 | Xian et al. | |
| 8,457,013 B2 | 6/2013 | Essinger et al. | |
| 8,459,557 B2 | 6/2013 | Havens et al. | |
| 8,469,272 B2 | 6/2013 | Kearney | |
| 8,474,712 B2 | 7/2013 | Kearney et al. | |
| 8,479,992 B2 | 7/2013 | Kotlarsky et al. | |
| 8,490,877 B2 | 7/2013 | Kearney | |
| 8,517,271 B2 | 8/2013 | Kotlarsky et al. | |
| 8,523,076 B2 | 9/2013 | Good | |
| 8,528,818 B2 | 9/2013 | Ehrhart et al. | |
| 8,544,737 B2 | 10/2013 | Gomez et al. | |
| 8,548,420 B2 | 10/2013 | Grunow et al. | |
| 8,550,335 B2 | 10/2013 | Samek et al. | |
| 8,550,354 B2 | 10/2013 | Gannon et al. | |
| 8,550,357 B2 | 10/2013 | Kearney | |
| 8,556,174 B2 | 10/2013 | Kosecki et al. | |
| 8,556,176 B2 | 10/2013 | Van Horn et al. | |
| 8,556,177 B2 | 10/2013 | Hussey et al. | |
| 8,559,767 B2 | 10/2013 | Barber et al. | |
| 8,561,895 B2 | 10/2013 | Gomez et al. | |
| 8,561,903 B2 | 10/2013 | Sauerwein | |
| 8,561,905 B2 | 10/2013 | Edmonds et al. | |
| 8,565,107 B2 | 10/2013 | Pease et al. | |
| 8,571,307 B2 | 10/2013 | Li et al. | |
| 8,579,200 B2 | 11/2013 | Samek et al. | |
| 8,583,924 B2 | 11/2013 | Caballero et al. | |
| 8,584,945 B2 | 11/2013 | Wang et al. | |
| 8,587,595 B2 | 11/2013 | Wang | |
| 8,587,697 B2 | 11/2013 | Hussey et al. | |
| 8,588,869 B2 | 11/2013 | Sauerwein et al. | |
| 8,590,789 B2 | 11/2013 | Nahill et al. | |
| 8,596,539 B2 | 12/2013 | Havens et al. | |
| 8,596,542 B2 | 12/2013 | Havens et al. | |
| 8,596,543 B2 | 12/2013 | Havens et al. | |
| 8,599,271 B2 | 12/2013 | Havens et al. | |
| 8,599,957 B2 | 12/2013 | Peake et al. | |
| 8,600,158 B2 | 12/2013 | Li et al. | |
| 8,600,167 B2 | 12/2013 | Showering | |
| 8,602,309 B2 | 12/2013 | Longacre et al. | |
| 8,608,053 B2 | 12/2013 | Meier et al. | |
| 8,608,071 B2 | 12/2013 | Liu et al. | |
| 8,611,309 B2 | 12/2013 | Wang et al. | |
| 8,615,487 B2 | 12/2013 | Gomez et al. | |
| 8,621,123 B2 | 12/2013 | Caballero | |
| 8,622,303 B2 | 1/2014 | Meier et al. | |
| 8,628,013 B2 | 1/2014 | Ding | |
| 8,628,015 B2 | 1/2014 | Wang et al. | |
| 8,628,016 B2 | 1/2014 | Winegar | |
| 8,629,926 B2 | 1/2014 | Wang | |
| 8,630,491 B2 | 1/2014 | Longacre et al. | |
| 8,635,309 B2 | 1/2014 | Berthiaume et al. | |
| 8,636,200 B2 | 1/2014 | Kearney | |
| 8,636,212 B2 | 1/2014 | Nahill et al. | |
| 8,636,215 B2 | 1/2014 | Ding et al. | |
| 8,636,224 B2 | 1/2014 | Wang | |
| 8,638,806 B2 | 1/2014 | Wang et al. | |
| 8,640,958 B2 | 2/2014 | Lu et al. | |
| 8,640,960 B2 | 2/2014 | Wang et al. | |
| 8,643,717 B2 | 2/2014 | Li et al. | |
| 8,646,692 B2 | 2/2014 | Meier et al. | |
| 8,646,694 B2 | 2/2014 | Wang et al. | |
| 8,657,200 B2 | 2/2014 | Ren et al. | |
| 8,659,397 B2 | 2/2014 | Vargo et al. | |
| 8,668,149 B2 | 3/2014 | Good | |
| 8,678,285 B2 | 3/2014 | Kearney | |
| 8,678,286 B2 | 3/2014 | Smith et al. | |
| 8,682,077 B1 | 3/2014 | Longacre | |
| D702,237 S | 4/2014 | Oberpriller et al. | |
| 8,687,282 B2 | 4/2014 | Feng et al. | |
| 8,692,927 B2 | 4/2014 | Pease et al. | |
| 8,695,880 B2 | 4/2014 | Bremer et al. | |
| 8,698,949 B2 | 4/2014 | Grunow et al. | |
| 8,702,000 B2 | 4/2014 | Barber et al. | |
| 8,717,494 B2 | 5/2014 | Gannon | |
| 8,720,783 B2 | 5/2014 | Biss et al. | |
| 8,723,804 B2 | 5/2014 | Fletcher et al. | |
| 8,723,904 B2 | 5/2014 | Marty et al. | |
| 8,727,223 B2 | 5/2014 | Wang | |
| 8,740,082 B2 | 6/2014 | Wilz | |
| 8,740,085 B2 | 6/2014 | Furlong et al. | |
| 8,746,563 B2 | 6/2014 | Hennick et al. | |
| 8,750,445 B2 | 6/2014 | Peake et al. | |
| 8,752,766 B2 | 6/2014 | Xian et al. | |
| 8,756,059 B2 | 6/2014 | Braho et al. | |
| 8,757,495 B2 | 6/2014 | Qu et al. | |
| 8,760,563 B2 | 6/2014 | Koziol et al. | |
| 8,736,909 B2 | 7/2014 | Reed et al. | |
| 8,777,108 B2 | 7/2014 | Coyle | |
| 8,777,109 B2 | 7/2014 | Oberpriller et al. | |
| 8,779,898 B2 | 7/2014 | Havens et al. | |
| 8,781,520 B2 | 7/2014 | Payne et al. | |
| 8,783,573 B2 | 7/2014 | Havens et al. | |
| 8,789,757 B2 | 7/2014 | Barten | |
| 8,789,758 B2 | 7/2014 | Hawley et al. | |
| 8,789,759 B2 | 7/2014 | Xian et al. | |
| 8,794,520 B2 | 8/2014 | Wang et al. | |
| 8,794,522 B2 | 8/2014 | Ehrhart | |
| 8,794,525 B2 | 8/2014 | Amundsen et al. | |
| 8,794,526 B2 | 8/2014 | Wang et al. | |
| 8,798,367 B2 | 8/2014 | Ellis | |
| 8,807,431 B2 | 8/2014 | Wang et al. | |
| 8,807,432 B2 | 8/2014 | Van Horn et al. | |
| 8,820,630 B2 | 9/2014 | Qu et al. | |
| 8,822,848 B2 | 9/2014 | Meagher | |
| 8,824,692 B2 | 9/2014 | Sheerin et al. | |
| 8,824,696 B2 | 9/2014 | Braho | |
| 8,842,849 B2 | 9/2014 | Wahl et al. | |
| 8,844,822 B2 | 9/2014 | Kotlarsky et al. | |
| 8,844,823 B2 | 9/2014 | Fritz et al. | |
| 8,849,019 B2 | 9/2014 | Li et al. | |
| D716,285 S | 10/2014 | Chaney et al. | |
| 8,851,383 B2 | 10/2014 | Yeakley et al. | |
| 8,854,633 B2 | 10/2014 | Laffargue | |
| 8,866,963 B2 | 10/2014 | Grunow et al. | |
| 8,868,421 B2 | 10/2014 | Braho et al. | |
| 8,868,519 B2 | 10/2014 | Maloy et al. | |
| 8,868,802 B2 | 10/2014 | Barten | |
| 8,868,803 B2 | 10/2014 | Bremer et al. | |
| 8,870,074 B1 | 10/2014 | Gannon | |
| 8,879,639 B2 | 11/2014 | Sauerwein | |
| 8,880,426 B2 | 11/2014 | Smith | |
| 8,881,983 B2 | 11/2014 | Havens et al. | |
| 8,881,987 B2 | 11/2014 | Wang | |
| 8,903,172 B2 | 12/2014 | Smith | |
| 8,908,995 B2 | 12/2014 | Benos et al. | |
| 8,910,870 B2 | 12/2014 | Li et al. | |
| 8,910,875 B2 | 12/2014 | Ren et al. | |
| 8,914,290 B2 | 12/2014 | Hendrickson et al. | |
| 8,914,788 B2 | 12/2014 | Pettinelli et al. | |
| 8,915,439 B2 | 12/2014 | Feng et al. | |
| 8,915,444 B2 | 12/2014 | Havens et al. | |
| 8,916,789 B2 | 12/2014 | Woodburn | |
| 8,918,250 B2 | 12/2014 | Hollifield | |

(56) References Cited

U.S. PATENT DOCUMENTS

| | | |
|---|---|---|
| 8,918,564 B2 | 12/2014 | Caballero |
| 8,925,818 B2 | 1/2015 | Kosecki et al. |
| 8,939,374 B2 | 1/2015 | Jovanovski et al. |
| 8,942,480 B2 | 1/2015 | Ellis |
| 8,944,313 B2 | 2/2015 | Williams et al. |
| 8,944,327 B2 | 2/2015 | Meier et al. |
| 8,944,332 B2 | 2/2015 | Harding et al. |
| 8,950,678 B2 | 2/2015 | Germaine et al. |
| D723,560 S | 3/2015 | Zhou et al. |
| 8,967,468 B2 | 3/2015 | Gomez et al. |
| 8,971,346 B2 | 3/2015 | Sevier |
| 8,976,030 B2 | 3/2015 | Cunningham et al. |
| 8,976,368 B2 | 3/2015 | Akel et al. |
| 8,978,981 B2 | 3/2015 | Guan |
| 8,978,983 B2 | 3/2015 | Bremer et al. |
| 8,978,984 B2 | 3/2015 | Hennick et al. |
| 8,985,456 B2 | 3/2015 | Zhu et al. |
| 8,985,457 B2 | 3/2015 | Soule et al. |
| 8,985,459 B2 | 3/2015 | Kearney et al. |
| 8,985,461 B2 | 3/2015 | Gelay et al. |
| 8,988,578 B2 | 3/2015 | Showering |
| 8,988,590 B2 | 3/2015 | Gillet et al. |
| 8,991,704 B2 | 3/2015 | Hopper et al. |
| 8,996,194 B2 | 3/2015 | Davis et al. |
| 8,996,384 B2 | 3/2015 | Funyak et al. |
| 8,998,091 B2 | 4/2015 | Edmonds et al. |
| 9,002,641 B2 | 4/2015 | Showering |
| 9,007,368 B2 | 4/2015 | Laffargue et al. |
| 9,010,641 B2 | 4/2015 | Qu et al. |
| 9,015,513 B2 | 4/2015 | Murawski et al. |
| 9,016,576 B2 | 4/2015 | Brady et al. |
| D730,357 S | 5/2015 | Fitch et al. |
| 9,022,288 B2 | 5/2015 | Nahill et al. |
| 9,030,964 B2 | 5/2015 | Essinger et al. |
| 9,033,240 B2 | 5/2015 | Smith et al. |
| 9,033,242 B2 | 5/2015 | Gillet et al. |
| 9,036,054 B2 | 5/2015 | Koziol et al. |
| 9,037,344 B2 | 5/2015 | Chamberlin |
| 9,038,911 B2 | 5/2015 | Xian et al. |
| 9,038,915 B2 | 5/2015 | Smith |
| D730,901 S | 6/2015 | Oberpriller et al. |
| D730,902 S | 6/2015 | Fitch et al. |
| D733,112 S | 6/2015 | Chaney et al. |
| 9,047,098 B2 | 6/2015 | Barten |
| 9,047,359 B2 | 6/2015 | Caballero et al. |
| 9,047,420 B2 | 6/2015 | Caballero |
| 9,047,525 B2 | 6/2015 | Barber |
| 9,047,531 B2 | 6/2015 | Showering et al. |
| 9,049,640 B2 | 6/2015 | Wang et al. |
| 9,053,055 B2 | 6/2015 | Caballero |
| 9,053,378 B1 | 6/2015 | Hou et al. |
| 9,053,380 B2 | 6/2015 | Xian et al. |
| 9,057,641 B2 | 6/2015 | Amundsen et al. |
| 9,058,526 B2 | 6/2015 | Powilleit |
| 9,064,165 B2 | 6/2015 | Havens et al. |
| 9,064,167 B2 | 6/2015 | Xian et al. |
| 9,064,168 B2 | 6/2015 | Todeschini et al. |
| 9,064,254 B2 | 6/2015 | Todeschini et al. |
| 9,066,032 B2 | 6/2015 | Wang |
| 9,070,032 B2 | 6/2015 | Corcoran |
| D734,339 S | 7/2015 | Zhou et al. |
| D734,751 S | 7/2015 | Oberpriller et al. |
| 9,082,023 B2 | 7/2015 | Feng et al. |
| 2007/0063048 A1 | 3/2007 | Havens et al. |
| 2009/0134221 A1 | 5/2009 | Zhu et al. |
| 2010/0135178 A1* | 6/2010 | Aggarwal ............ G01S 5/0205 370/252 |
| 2010/0177076 A1 | 7/2010 | Essinger et al. |
| 2010/0177080 A1 | 7/2010 | Essinger et al. |
| 2010/0177707 A1 | 7/2010 | Essinger et al. |
| 2010/0177749 A1 | 7/2010 | Essinger et al. |
| 2011/0002295 A1* | 1/2011 | Ghosal ............ H04W 36/0055 370/331 |
| 2011/0103318 A1 | 5/2011 | Ekici et al. |
| 2011/0169999 A1 | 7/2011 | Grunow et al. |
| 2011/0202554 A1 | 8/2011 | Powilleit et al. |
| 2012/0111946 A1 | 5/2012 | Golant |
| 2012/0168512 A1 | 7/2012 | Kotlarsky et al. |
| 2012/0193423 A1 | 8/2012 | Samek |
| 2012/0203647 A1 | 8/2012 | Smith |
| 2012/0223141 A1 | 9/2012 | Good et al. |
| 2013/0043312 A1 | 2/2013 | Van Horn |
| 2013/0075168 A1 | 3/2013 | Amundsen et al. |
| 2013/0115888 A1 | 5/2013 | Tipton et al. |
| 2013/0175341 A1 | 7/2013 | Kearney et al. |
| 2013/0175343 A1 | 7/2013 | Good |
| 2013/0257744 A1 | 10/2013 | Daghigh et al. |
| 2013/0257759 A1 | 10/2013 | Daghigh |
| 2013/0270346 A1 | 10/2013 | Xian et al. |
| 2013/0287258 A1 | 10/2013 | Kearney |
| 2013/0292475 A1 | 11/2013 | Kotlarsky et al. |
| 2013/0292477 A1 | 11/2013 | Hennick et al. |
| 2013/0293539 A1 | 11/2013 | Hunt et al. |
| 2013/0293540 A1 | 11/2013 | Laffargue et al. |
| 2013/0306728 A1 | 11/2013 | Thuries et al. |
| 2013/0306731 A1 | 11/2013 | Pedraro |
| 2013/0307964 A1 | 11/2013 | Bremer et al. |
| 2013/0308625 A1 | 11/2013 | Corcoran |
| 2013/0313324 A1 | 11/2013 | Koziol et al. |
| 2013/0313325 A1 | 11/2013 | Wilz et al. |
| 2013/0342717 A1 | 12/2013 | Havens et al. |
| 2014/0001267 A1 | 1/2014 | Giordano et al. |
| 2014/0002828 A1 | 1/2014 | Laffargue et al. |
| 2014/0008439 A1 | 1/2014 | Wang |
| 2014/0025584 A1 | 1/2014 | Liu et al. |
| 2014/0034734 A1 | 2/2014 | Sauerwein |
| 2014/0036848 A1 | 2/2014 | Pease et al. |
| 2014/0039693 A1 | 2/2014 | Havens et al. |
| 2014/0042814 A1 | 2/2014 | Kather et al. |
| 2014/0049120 A1 | 2/2014 | Kohtz et al. |
| 2014/0049635 A1 | 2/2014 | Laffargue et al. |
| 2014/0061306 A1 | 3/2014 | Wu et al. |
| 2014/0063289 A1 | 3/2014 | Hussey et al. |
| 2014/0066136 A1 | 3/2014 | Sauerwein et al. |
| 2014/0067692 A1 | 3/2014 | Ye et al. |
| 2014/0070005 A1 | 3/2014 | Nahill et al. |
| 2014/0071840 A1 | 3/2014 | Venancio |
| 2014/0074746 A1 | 3/2014 | Wang |
| 2014/0076974 A1 | 3/2014 | Havens et al. |
| 2014/0078341 A1 | 3/2014 | Havens et al. |
| 2014/0078342 A1 | 3/2014 | Li et al. |
| 2014/0078345 A1 | 3/2014 | Showering |
| 2014/0098792 A1 | 4/2014 | Wang et al. |
| 2014/0100774 A1 | 4/2014 | Showering |
| 2014/0100813 A1 | 4/2014 | Showering |
| 2014/0103115 A1 | 4/2014 | Meier et al. |
| 2014/0104413 A1 | 4/2014 | McCloskey et al. |
| 2014/0104414 A1 | 4/2014 | McCloskey et al. |
| 2014/0104416 A1 | 4/2014 | Li et al. |
| 2014/0104451 A1 | 4/2014 | Todeschini et al. |
| 2014/0106594 A1 | 4/2014 | Skvoretz |
| 2014/0106725 A1 | 4/2014 | Sauerwein |
| 2014/0108010 A1 | 4/2014 | Maltseff et al. |
| 2014/0108402 A1 | 4/2014 | Gomez et al. |
| 2014/0108682 A1 | 4/2014 | Caballero |
| 2014/0110485 A1 | 4/2014 | Toa et al. |
| 2014/0114530 A1 | 4/2014 | Fitch et al. |
| 2014/0121438 A1 | 5/2014 | Kearney |
| 2014/0121445 A1 | 5/2014 | Ding et al. |
| 2014/0124577 A1 | 5/2014 | Wang et al. |
| 2014/0124579 A1 | 5/2014 | Ding |
| 2014/0125842 A1 | 5/2014 | Winegar |
| 2014/0125853 A1 | 5/2014 | Wang |
| 2014/0125999 A1 | 5/2014 | Longacre et al. |
| 2014/0129378 A1 | 5/2014 | Richardson |
| 2014/0131441 A1 | 5/2014 | Nahill et al. |
| 2014/0131443 A1 | 5/2014 | Smith |
| 2014/0131444 A1 | 5/2014 | Wang |
| 2014/0131448 A1 | 5/2014 | Xian et al. |
| 2014/0133379 A1 | 5/2014 | Wang et al. |
| 2014/0136208 A1 | 5/2014 | Maltseff et al. |
| 2014/0140585 A1 | 5/2014 | Wang |
| 2014/0151453 A1 | 6/2014 | Meier et al. |
| 2014/0152882 A1 | 6/2014 | Samek et al. |

(56) References Cited

U.S. PATENT DOCUMENTS

| | | |
|---|---|---|
| 2014/0158770 A1 | 6/2014 | Sevier et al. |
| 2014/0159869 A1 | 6/2014 | Zumsteg et al. |
| 2014/0166755 A1 | 6/2014 | Liu et al. |
| 2014/0166757 A1 | 6/2014 | Smith |
| 2014/0166759 A1 | 6/2014 | Liu et al. |
| 2014/0168787 A1 | 6/2014 | Wang et al. |
| 2014/0175165 A1 | 6/2014 | Havens et al. |
| 2014/0175172 A1 | 6/2014 | Jovanovski et al. |
| 2014/0191644 A1 | 7/2014 | Chaney |
| 2014/0191913 A1 | 7/2014 | Ge et al. |
| 2014/0197238 A1 | 7/2014 | Lui et al. |
| 2014/0197239 A1 | 7/2014 | Havens et al. |
| 2014/0197304 A1 | 7/2014 | Feng et al. |
| 2014/0203087 A1 | 7/2014 | Smith et al. |
| 2014/0204268 A1 | 7/2014 | Grunow et al. |
| 2014/0214631 A1 | 7/2014 | Hansen |
| 2014/0217166 A1 | 8/2014 | Berthiaume et al. |
| 2014/0217180 A1 | 8/2014 | Liu |
| 2014/0223553 A1* | 8/2014 | Gupta ............ G06F 21/52 726/22 |
| 2014/0231500 A1 | 8/2014 | Ehrhart et al. |
| 2014/0232930 A1 | 8/2014 | Anderson |
| 2014/0247315 A1 | 9/2014 | Marty et al. |
| 2014/0263493 A1 | 9/2014 | Amurgis et al. |
| 2014/0263645 A1 | 9/2014 | Smith et al. |
| 2014/0270196 A1 | 9/2014 | Braho et al. |
| 2014/0270229 A1 | 9/2014 | Braho |
| 2014/0278387 A1 | 9/2014 | DiGregorio |
| 2014/0282210 A1 | 9/2014 | Bianconi |
| 2014/0284384 A1 | 9/2014 | Lu et al. |
| 2014/0287751 A1 | 9/2014 | Lee et al. |
| 2014/0288933 A1 | 9/2014 | Braho et al. |
| 2014/0297058 A1 | 10/2014 | Barker et al. |
| 2014/0299665 A1 | 10/2014 | Barber et al. |
| 2014/0312121 A1 | 10/2014 | Lu et al. |
| 2014/0319220 A1 | 10/2014 | Coyle |
| 2014/0319221 A1 | 10/2014 | Oberpriller et al. |
| 2014/0326787 A1 | 11/2014 | Barten |
| 2014/0332590 A1 | 11/2014 | Wang et al. |
| 2014/0344943 A1 | 11/2014 | Todeschini et al. |
| 2014/0346233 A1 | 11/2014 | Liu et al. |
| 2014/0351317 A1 | 11/2014 | Smith et al. |
| 2014/0353373 A1 | 12/2014 | Van Horn et al. |
| 2014/0361073 A1 | 12/2014 | Qu et al. |
| 2014/0361082 A1 | 12/2014 | Xian et al. |
| 2014/0362184 A1 | 12/2014 | Jovanovski et al. |
| 2014/0363015 A1 | 12/2014 | Braho |
| 2014/0369511 A1 | 12/2014 | Sheerin et al. |
| 2014/0374483 A1 | 12/2014 | Lu |
| 2014/0374485 A1 | 12/2014 | Xian et al. |
| 2015/0001301 A1 | 1/2015 | Ouyang |
| 2015/0001304 A1 | 1/2015 | Todeschini |
| 2015/0003673 A1 | 1/2015 | Fletcher |
| 2015/0009338 A1 | 1/2015 | Laffargue et al. |
| 2015/0009610 A1 | 1/2015 | London et al. |
| 2015/0014416 A1 | 1/2015 | Kotlarsky et al. |
| 2015/0021397 A1 | 1/2015 | Rueblinger et al. |
| 2015/0028102 A1 | 1/2015 | Ren et al. |
| 2015/0028103 A1 | 1/2015 | Jiang |
| 2015/0028104 A1 | 1/2015 | Ma et al. |
| 2015/0029002 A1 | 1/2015 | Yeakley et al. |
| 2015/0032709 A1 | 1/2015 | Maloy et al. |
| 2015/0039309 A1 | 2/2015 | Braho et al. |
| 2015/0040378 A1 | 2/2015 | Saber et al. |
| 2015/0048168 A1 | 2/2015 | Fritz et al. |
| 2015/0049347 A1 | 2/2015 | Laffargue et al. |
| 2015/0051992 A1 | 2/2015 | Smith |
| 2015/0053766 A1 | 2/2015 | Havens et al. |
| 2015/0053768 A1 | 2/2015 | Wang et al. |
| 2015/0053769 A1 | 2/2015 | Thuries et al. |
| 2015/0062366 A1 | 3/2015 | Liu et al. |
| 2015/0063215 A1 | 3/2015 | Wang |
| 2015/0063676 A1 | 3/2015 | Lloyd et al. |
| 2015/0069130 A1 | 3/2015 | Gannon |
| 2015/0071818 A1 | 3/2015 | Todeschini |
| 2015/0083800 A1 | 3/2015 | Li et al. |
| 2015/0086114 A1 | 3/2015 | Todeschini |
| 2015/0088522 A1 | 3/2015 | Hendrickson et al. |
| 2015/0096872 A1 | 4/2015 | Woodburn |
| 2015/0099557 A1 | 4/2015 | Pettinelli et al. |
| 2015/0100196 A1 | 4/2015 | Hollifield |
| 2015/0102109 A1 | 4/2015 | Huck |
| 2015/0115035 A1 | 4/2015 | Meier et al. |
| 2015/0127791 A1 | 5/2015 | Kosecki et al. |
| 2015/0128116 A1 | 5/2015 | Chen et al. |
| 2015/0129659 A1 | 5/2015 | Feng et al. |
| 2015/0133047 A1 | 5/2015 | Smith et al. |
| 2015/0134470 A1 | 5/2015 | Hejl et al. |
| 2015/0136851 A1 | 5/2015 | Harding et al. |
| 2015/0136854 A1 | 5/2015 | Lu et al. |
| 2015/0142492 A1 | 5/2015 | Kumar |
| 2015/0144692 A1 | 5/2015 | Hejl |
| 2015/0144698 A1 | 5/2015 | Teng et al. |
| 2015/0144701 A1 | 5/2015 | Xian et al. |
| 2015/0149946 A1 | 5/2015 | Benos et al. |
| 2015/0161429 A1 | 6/2015 | Xian |
| 2015/0169925 A1 | 6/2015 | Chang et al. |
| 2015/0169929 A1 | 6/2015 | Williams et al. |
| 2015/0186703 A1 | 7/2015 | Chen et al. |
| 2015/0193644 A1 | 7/2015 | Kearney et al. |
| 2015/0193645 A1 | 7/2015 | Colavito et al. |
| 2015/0199957 A1 | 7/2015 | Funyak et al. |
| 2015/0204671 A1 | 7/2015 | Showering |

FOREIGN PATENT DOCUMENTS

| | | |
|---|---|---|
| WO | 2013173985 A1 | 11/2013 |
| WO | 2014019130 A1 | 2/2014 |
| WO | 2014110495 A1 | 7/2014 |

OTHER PUBLICATIONS

U.S. Appl. No. 13/367,978, filed Feb. 7, 2012, (Feng et al.); now abandoned.

U.S. Appl. No. 14/462,801 for Mobile Computing Device With Data Cognition Software, filed Aug. 19, 2014 (Todeschini et al.); 38 pages.

U.S. Appl. No. 14/596,757 for System and Method for Detecting Barcode Printing Errors filed Jan. 14, 2015 (Ackley); 41 pages.

U.S. Appl. No. 14/277,337 for Multipurpose Optical Reader, filed May 14, 2014 (Jovanovski et al.); 59 pages.

U.S. Appl. No. 14/200,405 for Indicia Reader for Size-Limited Applications filed Mar. 7, 2014 (Feng et al.); 42 pages.

U.S. Appl. No. 14/662,922 for Multifunction Point of Sale System filed Mar. 19, 2015 (Van Horn et al.); 41 pages.

U.S. Appl. No. 14/446,391 for Multifunction Point of Sale Apparatus With Optical Signature Capture filed Jul. 30, 2014 (Good et al.); 37 pages.

U.S. Appl. No. 29/528,165 for In-Counter Barcode Scanner filed May 27, 2015 (Oberpriller et al.); 13 pages.

U.S. Appl. No. 29/528,890 for Mobile Computer Housing filed Jun. 2, 2015 (Fitch et al.); 61 pages.

U.S. Appl. No. 14/614,796 for Cargo Apportionment Techniques filed Feb. 5, 2015 (Morton et al.); 56 pages.

U.S. Appl. No. 29/516,892 for Table Computer filed Feb. 6, 2015 (Bidwell et al.); 13 pages.

U.S. Appl. No. 29/523,098 for Handle for a Tablet Computer filed Apr. 7, 2015 (Bidwell et al.); 17 pages.

U.S. Appl. No. 14/578,627 for Safety System and Method filed Dec. 22, 2014 (Ackley et al.); 32 pages.

U.S. Appl. No. 14/573,022 for Dynamic Diagnostic Indicator Generation filed Dec. 17, 2014 (Goldsmith); 43 pages.

U.S. Appl. No. 14/529,857 for Barcode Reader With Security Features filed Oct. 31, 2014 (Todeschini et al.); 32 pages.

U.S. Appl. No. 14/519,195 for Handheld Dimensioning System With Feedback filed Oct. 21, 2014 (Laffargue et al.); 39 pages.

U.S. Appl. No. 14/519,211 for System and Method for Dimensioning filed Oct. 21, 2014 (Ackley et al.); 33 pages.

U.S. Appl. No. 14/519,233 for Handheld Dimensioner With Data-Quality Indication filed Oct. 21, 2014 (Laffargue et al.); 36 pages.

(56) References Cited

OTHER PUBLICATIONS

U.S. Appl. No. 14/533,319 for Barcode Scanning System Using Wearable Device With Embedded Camera filed Nov. 5, 2014 (Todeschini); 29 pages.
U.S. Appl. No. 14/748,446 for Cordless Indicia Reader With a Multifunction Coil for Wireless Charging and Eas Deactivation, filed Jun. 24, 2015 (Xie et al.); 34 pages.
U.S. Appl. No. 29/528,590 for Electronic Device filed May 29, 2015 (Fitch et al.); 9 pages.
U.S. Appl. No. 14/519,249 for Handheld Dimensioning System With Measurement-Conformance Feedback filed Oct. 21, 2014 (Ackley et al.); 36 pages.
U.S. Appl. No. 29/519,017 for Scanner filed Mar. 2, 2015 (Zhou et al.); 11 pages.
U.S. Appl. No. 14/398,542 for Portable Electronic Devices Having a Separate Location Trigger Unit for Use in Controlling an Application Unit filed Nov. 3, 2014 (Bian et al.); 22 pages.
U.S. Appl. No. 14/405,278 for Design Pattern for Secure Store filed Mar. 9, 2015 (Zhu et al.); 23 pages.
U.S. Appl. No. 14/590,024 for Shelving and Package Locating Systems for Delivery Vehicles filed Jan. 6, 2015 (Payne); 31 pages.
U.S. Appl. No. 14/568,305 for Auto-Contrast Viewfinder for an Indicia Reader filed Dec. 12, 2014 (Todeschini); 29 pages.
U.S. Appl. No. 29/526,918 for Charging Base filed May 14, 2015 (Fitch et al.); 10 pages.
U.S. Appl. No. 14/580,262 for Media Gate for Thermal Transfer Printers filed Dec. 23, 2014 (Bowles); 36 pages.
U.S. Appl. No. 14/519,179 for Dimensioning System With Multipath Interference Mitigation filed Oct. 21, 2014 (Thuries et al.); 30 pages.
U.S. Appl. No. 14/264,173 for Autofocus Lens System for Indicia Readers filed Apr. 29, 2014, (Ackley et al.); 39 pages.
U.S. Appl. No. 14/453,019 for Dimensioning System With Guided Alignment, filed Aug. 6, 2014 (Li et al.); 31 pages.
U.S. Appl. No. 14/452,697 for Interactive Indicia Reader , filed Aug. 6, 2014, (Todeschini); 32 pages.
U.S. Appl. No. 14/231,898 for Hand-Mounted Indicia-Reading Device with Finger Motion Triggering filed Apr. 1, 2014 (Van Horn et al.); 36 pages.
U.S. Appl. No. 14/715,916 for Evaluating Image Values filed May 19, 2015 (Ackley); 60 pages.
U.S. Appl. No. 14/513,808 for Identifying Inventory Items in a Storage Facility filed Oct. 14, 2014 (Singel et al.); 51 pages.
U.S. Appl. No. 29/458,405 for an Electronic Device, filed Jun. 19, 2013 (Fitch et al.); 22 pages.
U.S. Appl. No. 29/459,620 for an Electronic Device Enclosure, filed Jul. 2, 2013 (London et al.); 21 pages.
U.S. Appl. No. 14/483,056 for Variable Depth of Field Barcode Scanner filed Sep. 10, 2014 (McCloskey et al.); 29 pages.
U.S. Appl. No. 14/531,154 for Directing an Inspector Through an Inspection filed Nov. 3, 2014 (Miller et al.); 53 pages.
U.S. Appl. No. 29/525,068 for Tablet Computer With Removable Scanning Device filed Apr. 27, 2015 (Schulte et al.); 19 pages.
U.S. Appl. No. 29/468,118 for an Electronic Device Case, filed Sep. 26, 2013 (Oberpriller et al.); 44 pages.
U.S. Appl. No. 14/340,627 for an Axially Reinforced Flexible Scan Element, filed Jul. 25, 2014 (Reublinger et al.); 41 pages.
U.S. Appl. No. 14/676,327 for Device Management Proxy for Secure Devices filed Apr. 1, 2015 (Yeakley et al.); 50 pages.
U.S. Appl. No. 14/257,364 for Docking System and Method Using Near Field Communication filed Apr. 21, 2014 (Showering); 31 pages.
U.S. Appl. No. 14/327,827 for a Mobile-Phone Adapter for Electronic Transactions, filed Jul. 10, 2014 (Hejl); 25 pages.
U.S. Appl. No. 14/334,934 for a System and Method for Indicia Verification, filed Jul. 18, 2014 (Hejl); 38 pages.
U.S. Appl. No. 29/530,600 for Cyclone filed Jun. 18, 2015 (Vargo et al); 16 pages.
U.S. Appl. No. 14/707,123 for Application Independent DEX/UCS Interface filed May 8, 2015 (Pape); 47 pages.
U.S. Appl. No. 14/283,282 for Terminal Having Illumination and Focus Control filed May 21, 2014 (Liu et al.); 31 pages.
U.S. Appl. No. 14/619,093 for Methods for Training a Speech Recognition System filed Feb. 11, 2015 (Pecorari); 35 pages.
U.S. Appl. No. 29/524,186 for Scanner filed Apr. 17, 2015 (Zhou et al.); 17 pages.
U.S. Appl. No. 14/705,407 for Method and System to Protect Software-Based Network-Connected Devices From Advanced Persistent Threat filed May 6, 2015 (Hussey et al.); 42 pages.
U.S. Appl. No. 14/614,706 for Device for Supporting an Electronic Tool on a User's Hand filed Feb. 5, 2015 (Oberpriller et al.); 33 pages.
U.S. Appl. No. 14/628,708 for Device, System, and Method for Determining the Status of Checkout Lanes filed Feb. 23, 2015 (Todeschini); 37 pages.
U.S. Appl. No. 14/704,050 for Intermediate Linear Positioning filed May 5, 2015 (Charpentier et al.); 60 pages.
U.S. Appl. No. 14/529,563 for Adaptable Interface for a Mobile Computing Device filed Oct. 31, 2014 (Schoon et al.); 36 pages.
U.S. Appl. No. 14/705,012 for Hands-Free Human Machine Interface Responsive to a Driver of a Vehicle filed May 6, 2015 (Fitch et al.); 44 pages.
U.S. Appl. No. 14/715,672 for Augumented Reality Enabled Hazard Display filed May 19, 2015 (Venkatesha et al.); 35 pages.
U.S. Appl. No. 14/695,364 for Medication Management System filed Apr. 24, 2015 (Sewell et al.); 44 pages.
U.S. Appl. No. 14/664,063 for Method and Application for Scanning a Barcode With a Smart Device While Continuously Running and Displaying an Application on the Smart Device Display filed Mar. 20, 2015 (Todeschini); 37 pages.
U.S. Appl. No. 14/735,717 for Indicia-Reading Systems Having an Interface With a User's Nervous System filed Jun. 10, 2015 (Todeschini); 39 pages.
U.S. Appl. No. 14/527,191 for Method and System for Recognizing Speech Using Wildcards in an Expected Response filed Oct. 29, 2014 (Braho et al.); 45 pages.
U.S. Appl. No. 14/702,110 for System and Method for Regulating Barcode Data Injection Into a Running Application on a Smart Device filed May 1, 2015 (Todeschini et al.); 38 pages.
U.S. Appl. No. 14/535,764 for Concatenated Expected Responses for Speech Recognition filed Nov. 7, 2014 (Braho et al.); 51 pages.
U.S. Appl. No. 14/687,289 for System for Communication Via a Peripheral Hub filed Apr. 15, 2015 (Kohtz et al.); 37 pages.
U.S. Appl. No. 14/747,197 for Optical Pattern Projector filed Jun. 23, 2015 (Thuries et al.); 33 pages.
U.S. Appl. No. 14/674,329 for Aimer for Barcode Scanning filed Mar. 31, 2015 (Bidwell); 36 pages.
U.S. Appl. No. 14/702,979 for Tracking Battery Conditions filed May 4, 2015 (Young et al.); 70 pages.
U.S. Appl. No. 29/529,441 for Indicia Reading Device filed Jun. 8, 2015 (Zhou et al.); 14 pages.
U.S. Appl. No. 14/747,490 for Dual-Projector Three-Dimensional Scanner filed Jun. 23, 2015 (Jovanovski et al.); 40 pages.
U.S. Appl. No. 14/740,320 for Tactile Switch for a Mobile Electronic Device filed Jun. 16, 2015 (Barndringa); 38 pages.
U.S. Appl. No. 14/695,923 for Secure Unattended Network Authentication filed Apr. 24, 2015 (Kubler et al.); 52 pages.
U.S. Appl. No. 14/740,373 for Calibrating a Volume Dimensioner filed Jun. 16, 2015 (Ackley et al.); 63 pages.

\* cited by examiner

200

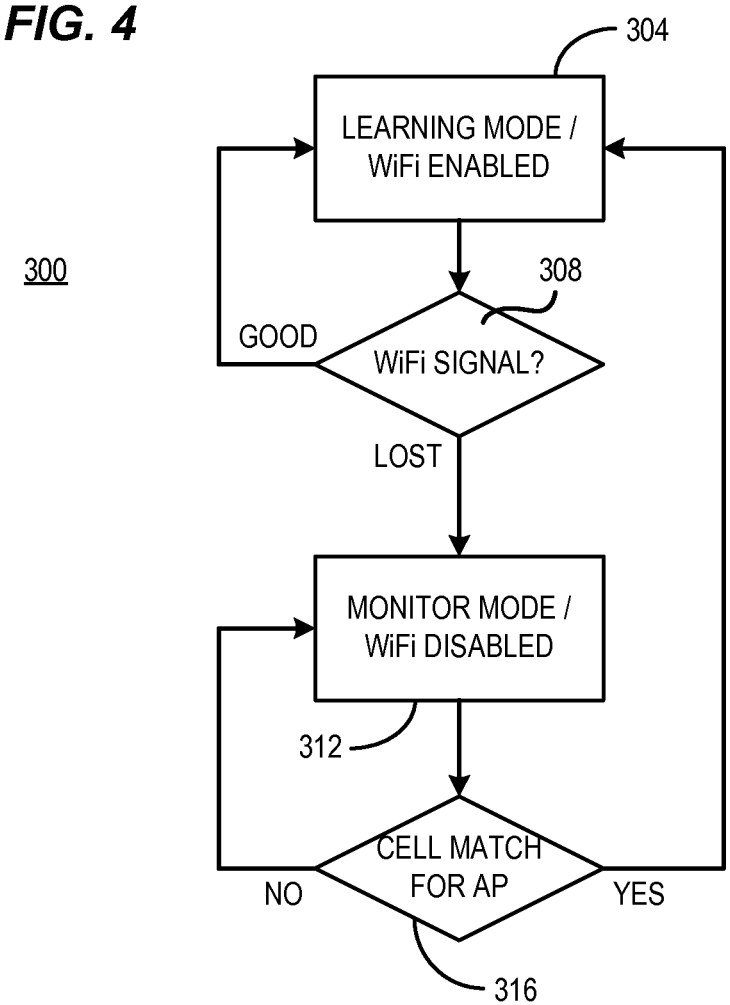

WIFI ENABLE BASED ON CELL SIGNALS

CROSS-REFERENCE TO RELATED APPLICATION

The present application claims the benefit of Chinese Patent Application for Invention No. 201510392751.7 filed Jul. 7, 2015 at the State Intellectual Property Office of China. The foregoing patent application is hereby incorporated by reference in its entirety.

FIELD OF THE INVENTION

The present invention relates to power conservation in devices that utilize WiFi communications.

BACKGROUND

Portable battery powered devices that are WiFi enabled are now commonplace including cellular telephones, tablet computers and other devices. Users rely on such devices for business and personal communications, but are sometimes limited by the battery life of such devices. Since WiFi communication circuitry is a significant drain on the batteries of such devices, it is desirable to minimize the power consumed by WiFi circuitry so as to extend battery life to the extent possible.

Therefore, a need exists for controlling WiFi communication circuitry in a manner than minimizes unnecessary power consumption.

SUMMARY

Accordingly, in one aspect, the present invention embraces a wireless device having a WiFi transceiver and a WWAN transceiver. A programmed processor is communicatively coupled to the WiFi transceiver and the WWAN transceiver. The processor is configured for connecting the WiFi transceiver to a WiFi access point; while the WiFi transceiver is connected to the WiFi access point, operating in a learning mode in which WWAN signals are characterized at a location of the WiFi access point and stored as an access point characterization; determining that the connection with the WiFi access point has been lost; upon determining that the connection with the WiFi access point has been lost, operating in a monitoring mode in which WWAN signals are compared to the stored access point characterization and in which the WiFi transceiver is disabled; determining that the WWAN signals match the WiFi access point characterization; and upon determining that the WWAN signals match the WiFi access point characterization, enabling the WiFi transceiver and reconnecting to the WiFi access point.

In certain example implementations, the WiFi access point characterization uses a table of one or more WWAN cell, where the table stores minimum and maximum signal strengths detected for each cell while the WiFi transceiver is connected to the access point in the learning mode. In certain example implementations, the processor is further configured to monitor the signal strength for each cell in the table and update values of minimum and maximum signal strength when the signal strength is greater than the stored maximum value or less than the minimum stored value while in the learning mode. In certain example implementations, determining that the WWAN signals match the WiFi access point characterization involves detecting transmission from a cell that appears in the table that has signal strength between the minimum and the maximum values stored in the table. In certain example implementations, the table is one of a plurality of tables in a database of tables, with each table being associated with a single WiFi access point. In certain example implementations, the processor is further configured to detect a transmission from a new cell that does not appear in the table for an access point to which the WiFi transceiver is connected; and create a table entry for the new cell that stores the new cell's minimum and maximum signal strength.

In another example embodiment, a method, carried out at a WiFi and WWAN capable device involves connecting a WiFi transceiver to a WiFi access point; while the WiFi transceiver is connected to the WiFi access point, operating the device in a learning mode in which WWAN signals are characterized at a location of the WiFi access point and stored as a WiFi access point characterization; determining that the WiFi transceiver has lost connection with the WiFi access point; upon determining that the WiFi transceiver has lost connection with the WiFi access point, operating the device in a monitoring mode in which WWAN signals are compared to the stored access point characterization and in which the WiFi transceiver is disabled; determining that the WWAN signals match the WiFi access point characterization; and upon determining that the WWAN signals match the WiFi access point characterization, enabling the WiFi transceiver and connecting to the WiFi access point.

In certain example implementations, the WiFi access point characterization uses a table of one or more WWAN cell, where the table stores minimum and maximum signal strengths detected for each cell while the WiFi transceiver is connected to the access point in the learning mode. In certain example implementations, the processor monitors the signal strength for each cell in the table and update values of minimum and maximum signal strength when the signal strength is greater than the stored maximum value or less than the minimum stored value while in the learning mode. In certain example implementations, determining that the WWAN signals match the WiFi access point characterization involves detecting transmission from a cell that appears in the table that has signal strength between the minimum and the maximum values stored in the table. In certain example implementations, the table is one of a plurality of tables in a database of tables, with each table being associated with a single WiFi access point. In certain example implementations, the process further involves detecting a transmission from a new cell that does not appear in the table for an access point to which the WiFi transceiver is connected; and creating a table entry for the new cell that stores the new cell's minimum and maximum signal strength.

In another example embodiment, a non-transitory computer readable storage device stores instructions that when executed by one or more programmed processors, carries out a process that involves connecting a WiFi transceiver of a wireless device to a WiFi access point; while the WiFi transceiver is connected to the WiFi access point, operating the wireless device in a learning mode in which WWAN signals are characterized at a location of the WiFi access point and stored as a WiFi access point characterization; determining that the WiFi transceiver has lost connection with the WiFi access point; upon determining that the WiFi transceiver has lost connection with the WiFi access point, operating the wireless device in a monitoring mode in which WWAN signals are compared to the stored access point characterization and in which the WiFi transceiver is disabled; determining that the WWAN signals match the WiFi access point characterization; and upon determining that the WWAN signals match the WiFi access point characterization, enabling the WiFi transceiver and connecting to the WiFi access point.

In certain example implementations, the WiFi access point characterization involves a table of one or more WWAN cell, where the table stores minimum and maximum signal strengths detected for each cell while the WiFi transceiver is connected to the access point in the learning mode. In certain example implementations, the processor monitors the signal strength for each cell in the table and update values of minimum and maximum signal strength when the signal strength is greater than the stored maximum value or less than the minimum stored value while in the learning mode. In certain example implementations, determining that the WWAN signals match the WiFi access point characterization involves detecting transmission from a cell that appears in the table that has signal strength between the minimum and the maximum values stored in the table. In certain example implementations, the table is one of a plurality of tables in a database of tables, with each table being associated with a single WiFi access point. In certain example implementations, further involves detecting a transmission from a new cell that does not appear in the table; and creating a table entry for the new cell that stores the new cell's minimum and maximum signal strength.

The foregoing illustrative summary, as well as other exemplary objectives and/or advantages of the invention, and the manner in which the same are accomplished, are further explained within the following detailed description and its accompanying drawings.

BRIEF DESCRIPTION OF THE DRAWINGS

FIG. 4 depicts an example flow chart showing an overall process consistent with certain illustrative embodiments.

DETAILED DESCRIPTION

Figure 1:
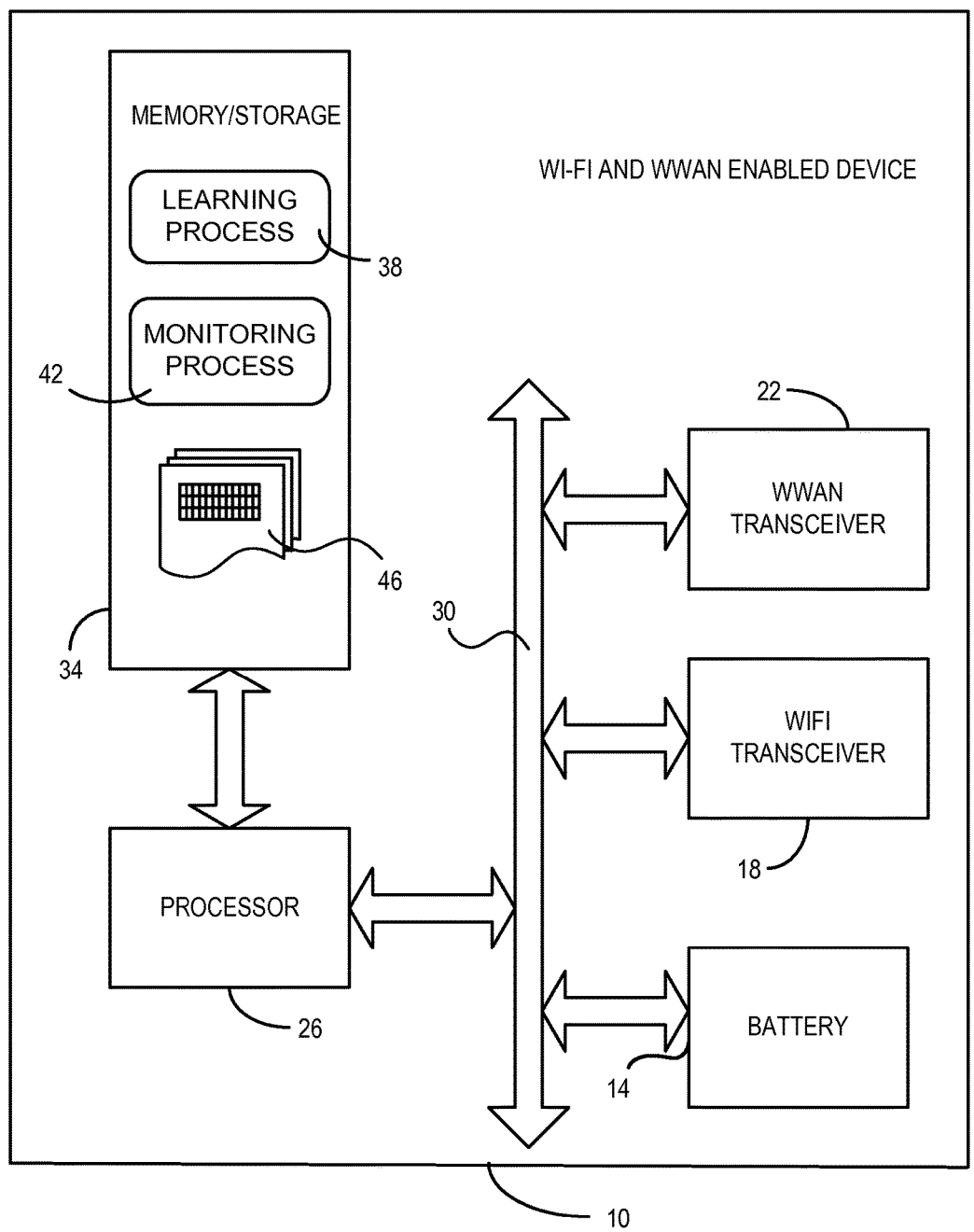
FIG. 1 depicts an example block diagram of a WiFi enabled system consistent with certain illustrative embodiments.

The present invention embraces a device and methods for controlling a WiFi circuit in a manner that reduces unnecessary power consumption when the device is not in an area that is known to have a WiFi system which the user considers acceptable.

In an example embodiment, a wireless device has a WiFi transceiver and a WWAN transceiver. A programmed processor is configured to connect the WiFi transceiver to an access point and while connected, operate in a learning mode in which WWAN signals are characterized at a location of the WiFi access point and stored as an access point characterization. When a connection to the AP is lost, operating in a monitoring mode in which WWAN signals are compared to the stored access point characterization with the WiFi transceiver disabled. When the WWAN signals match the WiFi AP characterization the WiFi transceiver is enabled to reconnect to a WiFi AP.

Many mobile phones and other battery powered portable devices (e.g., smartphones, video games, tablet computers, E-book readers, digital audio players, etc.) support WiFi communication. WiFi communication is a wireless communication networking technology that is generally considered synonymous with wireless local area networking (WLAN) technologies such as those based upon IEEE 802.11 standards.

These devices can connect to a WiFi access point (AP) for high speed data service. For purposes of this document, the term "access point" is intended to mean any device that provides wireless access to a network for a wireless device including wireless routers. The term "connect" or "connected" in this context means that the device is in wireless communication with a network that is accessible via the WiFi access point.

When a WiFi enabled device gets far enough away from, for example, a home or work WiFi AP, the device will conventionally scan for other available WiFi access points. This process is carried out in the background by periodically scanning for available WiFi networks. This allows the user to easily obtain access to available WiFi networks for when he or she is away from networks that are most commonly used. Unfortunately, this background scanning consumes considerable energy thereby draining the battery and leading to potential power consumption problems. Currently, users have to manually disable WIFI functions to conserve power if the WiFi is not needed, and then enable the WiFi function when they return to a known WIFI AP area. Unfortunately, many users do not know that doing so will enhance their battery live and even if they do, they may not remember to disable and enable the WiFi function.

In accord with certain embodiments consistent with the present teachings, the WiFi capable device can determine when to enable or disable the WiFi function of the mobile device automatically. For example, when a user leaves home or office, the WiFi enabled device can automatically disable WiFi to conserve battery life. When the user returns to the office or home, the WiFi enabled device can automatically turn on the WiFi functions.

In accord with these teachings, the WiFi capable device (i.e., a mobile device) need not know its location with high precision and need not utilize GPS signals (which may not be available inside buildings) to know where the mobile device is. The WiFi capable device "learns" the environment around the device at times when the device is connected to a WiFi AP. Next time the device enters the same area, it can turn on WiFi automatically and connect to a known WiFi AP. WiFi is considered enabled or turned on when it is fully active and capable of connecting with a WiFi AP. The WiFi is considered disabled or turned off when placed into any lower power state (e.g., transmitter off, a low power sleep mode, etc.) and inhibited from communication with a WiFi AP. Certain WiFi related functions may continue to operate when the WiFi is considered "off" or "disabled" depending on the particular hardware at issue, but generally there will be no WiFi transmission and may be no WiFi reception or scanning.

In order to carry out the processes described herein, the mobile device utilizes wireless wide area network functions (e.g. cellular communication signals) to characterize its current location. This information is then utilized to determine when the WiFi circuitry of the WiFi enabled device is to be enabled or disabled.

Referring now to FIG. 1, an illustrative WiFi enabled device (mobile device) 10 is depicted in block diagram form. This device is powered by a battery or battery pack 14 that is generally a rechargeable battery or battery pack (but this is not to be considered limiting). The device 10 includes circuitry for carrying out WiFi communications including a WiFi transceiver 18, as well as circuitry for carrying out WWAN communication including a WWAN transceiver 22.

The WiFi transceiver 18, as well as the WWAN transceiver 22, operates under control of one or more processors shown as processor 26. Processor 26 communicates with the WiFi transceiver 18 and WWAN transceiver 22 via one or more buses or communication lines depicted in FIG. 1 as bus or buses 30 for convenience of illustration. The WWAN transceiver 22 can provide information to the processor 26 regarding strength of WWAN signals and other relevant data. Similarly, WiFi transceiver 18 can provide processor 26 with data regarding the SSID and signal strength of WiFi networks within range. Battery 14 may report current battery status to the processor 26 as well as provide power to all of the circuitry in device 10 (power connections not shown for illustrative clarity).

Processor 26 operates under control of programming instructions stored in a memory or storage device 34 such as a non-transitory storage device. Certain example embodiments described herein, may be implemented using the programmed processor executing such programming instructions that are broadly described in flow chart form and that can be stored on any suitable electronic or computer readable non-transitory storage device 34 (such as, for example, disc storage, Read Only Memory (ROM) devices, Random Access Memory (RAM) devices, network memory devices, optical storage elements, magnetic storage elements, magneto-optical storage elements, flash memory and/or other equivalent volatile and non-volatile storage technologies), where the term "non-transitory" is intended to exclude propagating signals.

Those skilled in the art will appreciate, upon consideration of the present teachings, that the processes described herein can be implemented in any number of variations and in many suitable programming languages without departing from embodiments of the present invention. For example, the order of certain operations carried out can often be varied, additional operations can be added, or operations can be deleted without departing from certain example embodiments of the invention. Error trapping can be added and/or enhanced and variations can be made in user interface and information presentation without departing from certain example embodiments of the present invention.

The term "program" or "computer program" or similar terms, as used herein, is defined as a sequence of instructions designed for execution on a computer system. A "program", or "computer program", may include a subroutine, a function, a procedure, an object method, an object implementation, in an executable application, an app, a widget, an applet, a servlet, a source code, an object code, a sketch, a shared library/dynamic load library and/or other sequence of instructions designed for execution on a computer system. The term "processor", "controller", "CPU", "Computer" and the like as used herein encompasses both hard programmed, special purpose, general purpose and programmable devices and may encompass a plurality of such devices or a single device in either a distributed or centralized configuration without limitation.

Processor 26, in accord with certain embodiments, utilizes instructions stored on storage device 34 to control two basic processes to carry out the functions described herein. Those processes are referred to as a learning process and a monitoring process, and the associated programming instructions are stored in the storage device 34 as learning process 38 and monitoring process 42.

When device 10 is connected to a WiFi access point, the learning process 38 is be started. Briefly, the learning process 38 invokes the WWAN function to scan the mobile WWAN network signals around the device 10, and record all the available transmitters (cells) and their signal strength to a database 46 that is stored within storage device 34. This database 46 is then accessed to determine the general location of the device 10 so as to determine if the WiFi circuitry should be enabled so as to permit WiFi communication or disabled to conserve power during the monitoring process 42.

Figure 2:
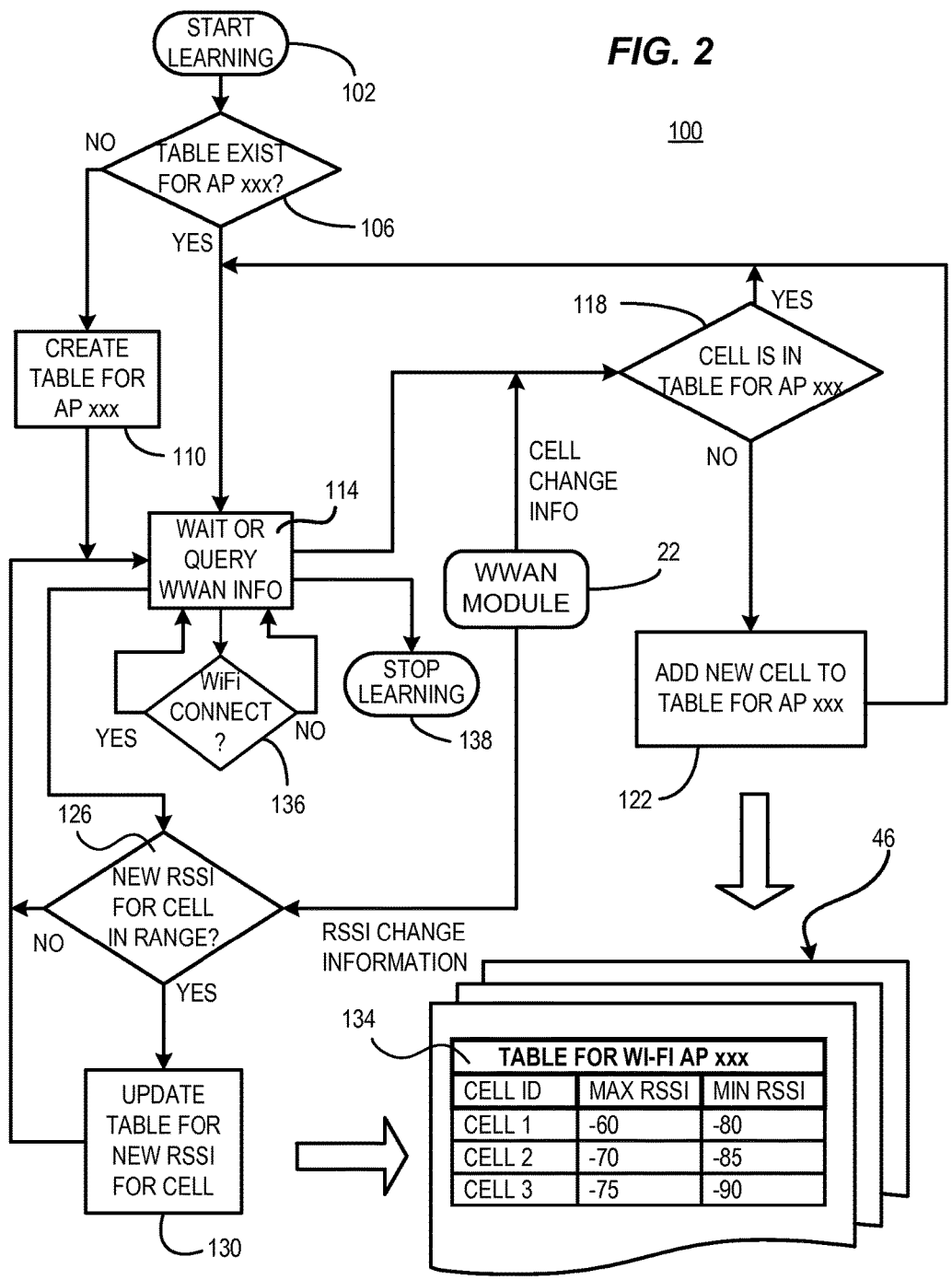
FIG. 2 depicts an example flow chart of a learning process consistent with certain illustrative embodiments.

Turning now to FIG. 2, an example learning process consistent with the present teachings is depicted as flow chart 100 starting at 102. Once started, the learning process 38 invokes the WWAN transceiver 22 to conduct a scan of mobile WWAN network signals available at the present location of the device 10. WWAN transceiver 22 then supplies information to the processor 26 for use in the process 100.

For the AP that is currently being used by the device 10, the process 100 first determines if a table exists in database 46 for the current access point (e.g., AP xxx) at 106. If not, a table is created for the current access point at 110 and control passes to 114. If there is already a table for the current access point, control passes from 106 to 114 bypassing 110. At 114, the process queries the WWAN transceiver module 22 for information about signals from the cell transmitters (cells) that are being received and waits for receipt of the results.

For each cell signal being received, if the cell is in the current table at 118, no additional cell is needed and the process returns to 114. But if a new cell is identified at 114, then the new cell is added to the table for the current access point at 122 and control returns to 114.

Database 46 stores information in each AP table for each cell transmitter in the form of a range of received signal strength values RSSI (received signal strength indicator). So, when the WWAN transceiver 22 reports the signal strength of a particular cell, processor 26 can determine by reference to the table if this is a new minimum or maximum RSSI for that particular cell at 126. If this new value affects the range stored in the table for the current AP at 126, then the RSSI value is updated at 130 for the cell. Control then returns to 144. If no new RSSI value is identified for the cell at 126, the process returns to 114. The database 46 contains one table for each AP and each table serves as a characterization of the environment for each WiFi AP in terms of the cell transmitters that are available and the range of signal strengths for each cell transmitter that can be received at the WWAN transceiver when connected to the WiFi AP.

For the example shown in FIG. 2, cell 1 has minimum and maximum values of −80 and −60 respectively; cell 2 has minimum and maximum values of −85 and −70 respectively; and cell 3 has minimum and maximum values of −90 and −75 respectively. If, for example, a new cell signal is detected at 118 by processor 26, then a new row would be added to table 134 for AP xxx of database 46. If a new maximum or minimum RSSI is identified by processor 26 at 126, then the value for either max or min value for a particular cell is modified in table 134.

For example, if the current access point is named "Jason Home WiFi", the table might look like this:

| TABLE FOR WI-FI AP 'Jason Home WiFi' | | |
|---|---|---|
| CELL ID | MAX RSSI | MIN RSSI |
| CELL 1 | −55 | −62 |
| CELL 2 | −73 | −87 |

If the scanning process determined that a new cell (Cell 3) was identified with RSSI of −90, and the signal strength of Cell 1 is at −62, the table would be revised according to the process 100 to look like this:

| TABLE FOR WI-FI AP 'Jason Home Wifi' | | |
|---|---|---|
| CELL ID | MAX RSSI | MIN RSSI |
| CELL 1 | −55 | −62 |
| CELL 2 | −73 | −87 |
| CELL 3 | −90 | −90 |

Both minimum and maximum RSSI values can be set to first received RSSI value for the new added cell (−90 in this example). When a new cell is added to the table, the process will keep updating the range as new RSSI values are measured.

Hence, the learning process monitors the cell signal strength and records the maximum and minimum values. The learning process will check and update the range just as before. The RSSI of the cell when it loses WIFI connection may not be the minimum value (e.g., if the device is moving toward the cell tower when it goes outside of the WI-FI range).

The learning process updates the record of available cells and their maximum and minimum signal strength whenever the device 10 is connected to a WiFi AP. For each WiFi AP, a table such as 134 is stored in database 46, so that the learning process manages a different record for each different WiFi AP. The learning process 100 monitors the status of the current WiFi connection at 136 and the learning process is stopped at 138 when device 10 loses connection as detected at 136 to the current WiFi AP.

At this point, the database 46 contains a record in the form of table 134 for AP xxx that can be used to characterize the location of AP xxx in terms of cell signals and strength of the cell signals. Thus, if the device 10 is at a location in which is characterized by −60≥Cell 1 RSSI≥−80, and −70≥Cell 2 RSSI≥−85, and −75≥Cell 3 RSSI≥−90; then the processor can reasonably deduce that it is likely within range of the AP xxx and can enable the WiFi transceiver 18.

Figure 3:
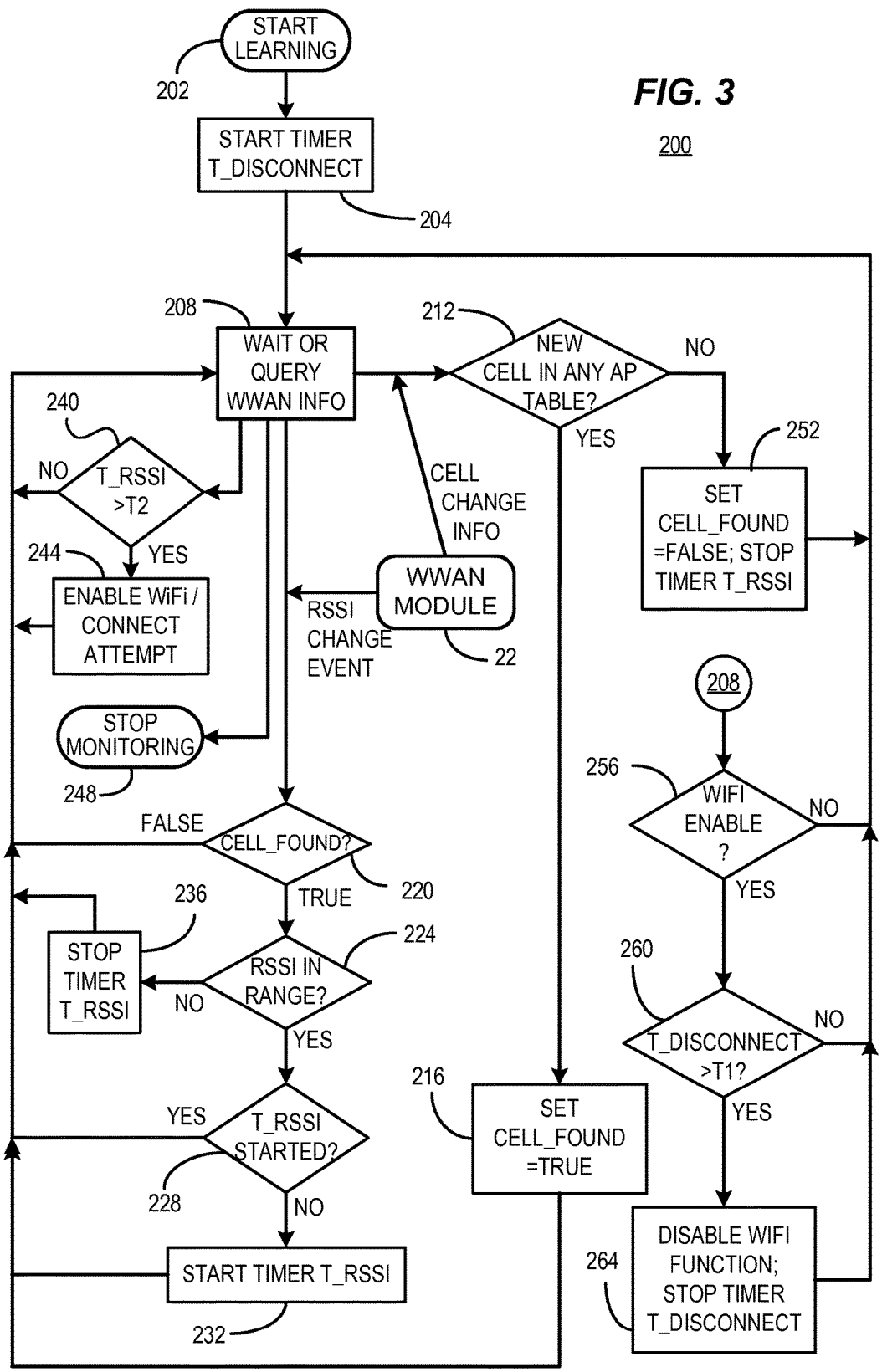
FIG. 3 depicts an example flow chart of a monitoring process consistent with certain illustrative embodiments.

Referring now to FIG. 3, an example process 200 is depicted starting at 202 (upon halting of operation in the learning mode, the monitoring mode begins). When the learning process 100 is stopped at 202, the monitoring process 200 begins which is responsible for control of the processor 26 for enabling and disabling the WiFi transceiver 18 functions according to the cell signal strength records and current cell signals.

At 204, a start timer T_DISCONNECT is initiated. Timer T_DISCONNECT may be a timer that times out after T1 seconds, for example, T1 may be set to equal about 30 to about 300 seconds, but this is not to be considered limiting. Timer T_DISCONNECT serves the function of waiting for a period of time before turning off Wi-Fi transceiver to permit the Wi-Fi module (transceiver) to re-connect to Wi-Fi AP in the event of a temporary drop in signal strength. For example, if the device 10 is moving around the edge of the Wi-Fi AP's coverage area and the signal strength temporarily drops, it is desirable for the Wi-Fi transceiver to be able to recover for a short period of time (e.g., up to a few minutes).

From 204, control passes to 208 where the process queries for WWAN information from WWAN module 22 and waits for the results of the query. Cell change information is provided by WWAN module 22 and if a new cell that is known by virtue of recordation of that cell in any table of database 46 is detected at 212, then a flag CELL_FOUND is set to true at 216 and control returns to 208. This indicates that device 10 may be in range of a known AP.

If the device 10 moves to a location in which a cell is identified at 220 by virtue of CELL_FOUND being set to true, and if the signal strength (RSSI) as provided by WWAN module 22 to processor 26 is in the range between minimum and maximum as stored in a signal strength record in database 46 at 224, then the processor 26 deduces that there may be a known WiFi AP within range of the device 10. Throughout this monitoring process, mobile cells are monitored to check and see if identified cells match any known cells in the database 46 records.

Once it is determined that a known cell is identified and has an RSSI in the range stored in database 46 at 220 and 224, the status of a timer T_RSSI is checked at 228. If the timer has not started at 228, the timer is initiated at 232 and control passes back to 208. If the timer has already been started at 228, control still passes back to 208.

Timer T_RSSI may be a timer that times out after T2 seconds, for example, T2 may be set to equal about 5 to 30 seconds, but this is not to be considered limiting. Timer T_RSSI serves the function of _make sure the signal strength is stable enough in the range.

At 220, if a known cell (a cell that appears in one of the records of database 46) is not found, the process goes back to 208 to await the results of the next query. If the RSSI is not in a stored range for any of the records in database 46 at 224, the timer T_RSSI is commanded to stop at 236, so that if the timer is running, it will be halted.

The monitoring process 200 decides that there is a WIFI AP nearby by monitoring the timer T_RSSI, and if T_RSSI exceeds T2 at 240, then it is determined that the location of device 10 has likely been in range of a known AP long enough to presume that WiFi services might be appropriate. So, at this point processor 26 turns on (enables) the WiFi function at 244 and attempts to connect with the known AP. The process then continues back to 208. When other criteria are met, the monitoring process is stopped at 248 and processor 26 re-enters the learning process.

At 212, if no new cell has been detected, then the flag CELL_FOUND is set to false at 252 and the timer T_RSSI is stopped. The process then passes back to 208. Processor 26 determines if the WiFi transceiver 18 is enabled at 256. Of not, control returns to 208, but if the WiFi transceiver 18 is enabled at 256, the processor checks T_DISCONNECT against T1 at 260 and if T_DISCONNECT is not greater than T1, returns control to 208. If T_Disconnect is greater than T1 at 260, the WiFi function is disabled at 264 and the timer T_Disconnect is stopped and control returns to 208.

Hence, the monitoring process queries the WiFi status to check the WiFi scanning and connect status. If the device 10 fails to connect to a WiFi AP, the monitoring process will turn off the WiFi function and continue with the monitoring process. But, if device 10 successfully connects to a WiFi AP, the monitoring process halts 200 and the learning process 100 restarts.

When Trssi>T2, the monitoring process enables the WiFi function at 240. The device 10 will try to connect to the WiFi AP in which table that contains a detected cell. The device 10 can incorporate a retry mechanism at 244 for making attempts to re-try to make the connection if it fails to connect to the WiFi AP. The monitoring process stops at 248 when the device 10 connects to the WiFi AP successfully.

Referring now to FIG. 4, an example of an overall process is depicted in which the change of states or modes of operation is shown at a high level. In this example, process 300, may be considered to be in the learning mode 304 during which time WiFi is enabled and WiFi communication can be carried out. The cell signals are monitored and database 46 is refined according to the measurement of cell signals as previously discussed.

If the WiFi signal and AP connection are lost at 308, the process changes to the monitor mode at 312 with the WiFi disabled and the state of cell signals is monitored to try to identify a pattern of cell signals that is indicative that a known AP may be available for connection. The WiFi is disabled so as to conserve power during this mode of operation. In the case of a cellular telephone, such devices continually monitor the status of cell sites anyway, so minimal additional resources are employed to determine if the cell signals are in database 46. When a cell signal is matched to the database, and connection to an AP is possible or achieved, the monitoring process halts at 316 and the learning process is restarted with WiFi operation enabled at 304.

Thus, a wireless device consistent with the present teachings has a WiFi transceiver and a WWAN transceiver. A programmed processor is communicatively coupled to the WiFi transceiver and the WWAN transceiver, with the processor being configured for connecting the WiFi transceiver to a WiFi access point; while the WiFi transceiver is connected to the WiFi access point, operating in a learning mode in which WWAN signals are characterized at a location of the WiFi access point and stored as an access point characterization; determining that the connection with the WiFi access point has been lost; upon determining that the connection with the WiFi access point has been lost, operating in a monitoring mode in which WWAN signals are compared to the stored access point characterization and in which the WiFi transceiver is disabled; determining that the WWAN signals match the WiFi access point characterization; and upon determining that the WWAN signals match the WiFi access point characterization, enabling the WiFi transceiver and reconnecting to the WiFi access point.

A method consistent with the present teachings and carried out at a WiFi and WWAN capable device involves connecting a WiFi transceiver to a WiFi access point; while the WiFi transceiver is connected to the WiFi access point, operating the device in a learning mode in which WWAN signals are characterized at a location of the WiFi access point and stored as an access point characterization; determining that the WiFi transceiver has lost connection with the WiFi access point; upon determining that the WiFi transceiver has lost connection with the WiFi access point, operating the device in a monitoring mode in which WWAN signals are compared to the stored access point characterization and in which the WiFi transceiver is disabled; determining that the WWAN signals match the WiFi access point characterization; and upon determining that the WWAN signals match the WiFi access point characterization, enabling the WiFi transceiver and connecting to the WiFi access point.

A non-transitory computer readable storage device consistent with these teachings stores instructions that when executed by one or more programmed processors, carries out a process that involves connecting a WiFi transceiver of a wireless device to a WiFi access point; while the WiFi transceiver is connected to the WiFi access point, operating the wireless device in a learning mode in which WWAN signals are characterized at a location of the WiFi access point and stored as a WiFi access point characterization; determining that the WiFi transceiver has lost connection with the WiFi access point; upon determining that the WiFi transceiver has lost connection with the WiFi access point, operating the wireless device in a monitoring mode in which WWAN signals are compared to the stored access point characterization and in which the WiFi transceiver is disabled; determining that the WWAN signals match the WiFi access point characterization; and upon determining that the WWAN signals match the WiFi access point characterization, enabling the WiFi transceiver and connecting to the WiFi access point.

To supplement the present disclosure, this application incorporates entirely by reference the following commonly assigned patents, patent application publications, and patent applications: To supplement the present disclosure, this application incorporates entirely by reference the following patents, patent application publications, and patent applications:

U.S. Pat. No. 6,832,725; U.S. Pat. No. 7,128,266;
U.S. Pat. No. 7,159,783; U.S. Pat. No. 7,413,127;
U.S. Pat. No. 7,726,575; U.S. Pat. No. 8,294,969;
U.S. Pat. No. 8,317,105; U.S. Pat. No. 8,322,622;
U.S. Pat. No. 8,366,005; U.S. Pat. No. 8,371,507;
U.S. Pat. No. 8,376,233; U.S. Pat. No. 8,381,979;
U.S. Pat. No. 8,390,909; U.S. Pat. No. 8,408,464;
U.S. Pat. No. 8,408,468; U.S. Pat. No. 8,408,469;
U.S. Pat. No. 8,424,768; U.S. Pat. No. 8,448,863;
U.S. Pat. No. 8,457,013; U.S. Pat. No. 8,459,557;
U.S. Pat. No. 8,469,272; U.S. Pat. No. 8,474,712;
U.S. Pat. No. 8,479,992; U.S. Pat. No. 8,490,877;
U.S. Pat. No. 8,517,271; U.S. Pat. No. 8,523,076;
U.S. Pat. No. 8,528,818; U.S. Pat. No. 8,544,737;
U.S. Pat. No. 8,548,242; U.S. Pat. No. 8,548,420;
U.S. Pat. No. 8,550,335; U.S. Pat. No. 8,550,354;
U.S. Pat. No. 8,550,357; U.S. Pat. No. 8,556,174;
U.S. Pat. No. 8,556,176; U.S. Pat. No. 8,556,177;
U.S. Pat. No. 8,559,767; U.S. Pat. No. 8,599,957;
U.S. Pat. No. 8,561,895; U.S. Pat. No. 8,561,903;
U.S. Pat. No. 8,561,905; U.S. Pat. No. 8,565,107;
U.S. Pat. No. 8,571,307; U.S. Pat. No. 8,579,200;
U.S. Pat. No. 8,583,924; U.S. Pat. No. 8,584,945;
U.S. Pat. No. 8,587,595; U.S. Pat. No. 8,587,697;
U.S. Pat. No. 8,588,869; U.S. Pat. No. 8,590,789;
U.S. Pat. No. 8,596,539; U.S. Pat. No. 8,596,542;
U.S. Pat. No. 8,596,543; U.S. Pat. No. 8,599,271;
U.S. Pat. No. 8,599,957; U.S. Pat. No. 8,600,158;
U.S. Pat. No. 8,600,167; U.S. Pat. No. 8,602,309;
U.S. Pat. No. 8,608,053; U.S. Pat. No. 8,608,071;
U.S. Pat. No. 8,611,309; U.S. Pat. No. 8,615,487;
U.S. Pat. No. 8,616,454; U.S. Pat. No. 8,621,123;
U.S. Pat. No. 8,622,303; U.S. Pat. No. 8,628,013;
U.S. Pat. No. 8,628,015; U.S. Pat. No. 8,628,016;
U.S. Pat. No. 8,629,926; U.S. Pat. No. 8,630,491;
U.S. Pat. No. 8,635,309; U.S. Pat. No. 8,636,200;
U.S. Pat. No. 8,636,212; U.S. Pat. No. 8,636,215;
U.S. Pat. No. 8,636,224; U.S. Pat. No. 8,638,806;
U.S. Pat. No. 8,640,958; U.S. Pat. No. 8,640,960;
U.S. Pat. No. 8,643,717; U.S. Pat. No. 8,646,692;
U.S. Pat. No. 8,646,694; U.S. Pat. No. 8,657,200;
U.S. Pat. No. 8,659,397; U.S. Pat. No. 8,668,149;
U.S. Pat. No. 8,678,285; U.S. Pat. No. 8,678,286;
U.S. Pat. No. 8,682,077; U.S. Pat. No. 8,687,282;
U.S. Pat. No. 8,692,927; U.S. Pat. No. 8,695,880;
U.S. Pat. No. 8,698,949; U.S. Pat. No. 8,717,494;
U.S. Pat. No. 8,717,494; U.S. Pat. No. 8,720,783;
U.S. Pat. No. 8,723,804; U.S. Pat. No. 8,723,904;
U.S. Pat. No. 8,727,223; U.S. Pat. No. D702,237;
U.S. Pat. No. 8,740,082; U.S. Pat. No. 8,740,085;

U.S. Pat. No. 8,746,563; U.S. Pat. No. 8,750,445;
U.S. Pat. No. 8,752,766; U.S. Pat. No. 8,756,059;
U.S. Pat. No. 8,757,495; U.S. Pat. No. 8,760,563;
U.S. Pat. No. 8,763,909; U.S. Pat. No. 8,777,108;
U.S. Pat. No. 8,777,109; U.S. Pat. No. 8,779,898;
U.S. Pat. No. 8,781,520; U.S. Pat. No. 8,783,573;
U.S. Pat. No. 8,789,757; U.S. Pat. No. 8,789,758;
U.S. Pat. No. 8,789,759; U.S. Pat. No. 8,794,520;
U.S. Pat. No. 8,794,522; U.S. Pat. No. 8,794,526;
U.S. Pat. No. 8,798,367; U.S. Pat. No. 8,807,431;
U.S. Pat. No. 8,807,432; U.S. Pat. No. 8,820,630;
International Publication No. 2013/163789;
International Publication No. 2013/173985;
International Publication No. 2014/019130;
International Publication No. 2014/110495;
U.S. Patent Application Publication No. 2008/0185432;
U.S. Patent Application Publication No. 2009/0134221;
U.S. Patent Application Publication No. 2010/0177080;
U.S. Patent Application Publication No. 2010/0177076;
U.S. Patent Application Publication No. 2010/0177707;
U.S. Patent Application Publication No. 2010/0177749;
U.S. Patent Application Publication No. 2011/0202554;
U.S. Patent Application Publication No. 2012/0111946;
U.S. Patent Application Publication No. 2012/0138685;
U.S. Patent Application Publication No. 2012/0168511;
U.S. Patent Application Publication No. 2012/0168512;
U.S. Patent Application Publication No. 2012/0193423;
U.S. Patent Application Publication No. 2012/0203647;
U.S. Patent Application Publication No. 2012/0223141;
U.S. Patent Application Publication No. 2012/0228382;
U.S. Patent Application Publication No. 2012/0248188;
U.S. Patent Application Publication No. 2013/0043312;
U.S. Patent Application Publication No. 2013/0056285;
U.S. Patent Application Publication No. 2013/0070322;
U.S. Patent Application Publication No. 2013/0075168;
U.S. Patent Application Publication No. 2013/0082104;
U.S. Patent Application Publication No. 2013/0175341;
U.S. Patent Application Publication No. 2013/0175343;
U.S. Patent Application Publication No. 2013/0200158;
U.S. Patent Application Publication No. 2013/0256418;
U.S. Patent Application Publication No. 2013/0257744;
U.S. Patent Application Publication No. 2013/0257759;
U.S. Patent Application Publication No. 2013/0270346;
U.S. Patent Application Publication No. 2013/0278425;
U.S. Patent Application Publication No. 2013/0287258;
U.S. Patent Application Publication No. 2013/0292475;
U.S. Patent Application Publication No. 2013/0292477;
U.S. Patent Application Publication No. 2013/0293539;
U.S. Patent Application Publication No. 2013/0293540;
U.S. Patent Application Publication No. 2013/0306728;
U.S. Patent Application Publication No. 2013/0306730;
U.S. Patent Application Publication No. 2013/0306731;
U.S. Patent Application Publication No. 2013/0307964;
U.S. Patent Application Publication No. 2013/0308625;
U.S. Patent Application Publication No. 2013/0313324;
U.S. Patent Application Publication No. 2013/0313325;
U.S. Patent Application Publication No. 2013/0341399;
U.S. Patent Application Publication No. 2013/0342717;
U.S. Patent Application Publication No. 2014/0001267;
U.S. Patent Application Publication No. 2014/0002828;
U.S. Patent Application Publication No. 2014/0008430;
U.S. Patent Application Publication No. 2014/0008439;
U.S. Patent Application Publication No. 2014/0025584;
U.S. Patent Application Publication No. 2014/0027518;
U.S. Patent Application Publication No. 2014/0034734;
U.S. Patent Application Publication No. 2014/0036848;
U.S. Patent Application Publication No. 2014/0039693;
U.S. Patent Application Publication No. 2014/0042814;
U.S. Patent Application Publication No. 2014/0049120;
U.S. Patent Application Publication No. 2014/0049635;
U.S. Patent Application Publication No. 2014/0061305;
U.S. Patent Application Publication No. 2014/0061306;
U.S. Patent Application Publication No. 2014/0063289;
U.S. Patent Application Publication No. 2014/0066136;
U.S. Patent Application Publication No. 2014/0067692;
U.S. Patent Application Publication No. 2014/0070005;
U.S. Patent Application Publication No. 2014/0071840;
U.S. Patent Application Publication No. 2014/0074746;
U.S. Patent Application Publication No. 2014/0075846;
U.S. Patent Application Publication No. 2014/0076974;
U.S. Patent Application Publication No. 2014/0078341;
U.S. Patent Application Publication No. 2014/0078342;
U.S. Patent Application Publication No. 2014/0078345;
U.S. Patent Application Publication No. 2014/0084068;
U.S. Patent Application Publication No. 2014/0097249;
U.S. Patent Application Publication No. 2014/0098792;
U.S. Patent Application Publication No. 2014/0100774;
U.S. Patent Application Publication No. 2014/0100813;
U.S. Patent Application Publication No. 2014/0103115;
U.S. Patent Application Publication No. 2014/0104413;
U.S. Patent Application Publication No. 2014/0104414;
U.S. Patent Application Publication No. 2014/0104416;
U.S. Patent Application Publication No. 2014/0104451;
U.S. Patent Application Publication No. 2014/0106594;
U.S. Patent Application Publication No. 2014/0106725;
U.S. Patent Application Publication No. 2014/0108010;
U.S. Patent Application Publication No. 2014/0108402;
U.S. Patent Application Publication No. 2014/0108682;
U.S. Patent Application Publication No. 2014/0110485;
U.S. Patent Application Publication No. 2014/0114530;
U.S. Patent Application Publication No. 2014/0124577;
U.S. Patent Application Publication No. 2014/0124579;
U.S. Patent Application Publication No. 2014/0125842;
U.S. Patent Application Publication No. 2014/0125853;
U.S. Patent Application Publication No. 2014/0125999;
U.S. Patent Application Publication No. 2014/0129378;
U.S. Patent Application Publication No. 2014/0131438;
U.S. Patent Application Publication No. 2014/0131441;
U.S. Patent Application Publication No. 2014/0131443;
U.S. Patent Application Publication No. 2014/0131444;
U.S. Patent Application Publication No. 2014/0131445;
U.S. Patent Application Publication No. 2014/0131448;
U.S. Patent Application Publication No. 2014/0133379;
U.S. Patent Application Publication No. 2014/0136208;
U.S. Patent Application Publication No. 2014/0140585;
U.S. Patent Application Publication No. 2014/0151453;
U.S. Patent Application Publication No. 2014/0152882;
U.S. Patent Application Publication No. 2014/0158770;
U.S. Patent Application Publication No. 2014/0159869;
U.S. Patent Application Publication No. 2014/0160329;
U.S. Patent Application Publication No. 2014/0166755;
U.S. Patent Application Publication No. 2014/0166757;
U.S. Patent Application Publication No. 2014/0166759;
U.S. Patent Application Publication No. 2014/0166760;
U.S. Patent Application Publication No. 2014/0166761;
U.S. Patent Application Publication No. 2014/0168787;
U.S. Patent Application Publication No. 2014/0175165;
U.S. Patent Application Publication No. 2014/0175169;
U.S. Patent Application Publication No. 2014/0175172;
U.S. Patent Application Publication No. 2014/0175174;
U.S. Patent Application Publication No. 2014/0191644;
U.S. Patent Application Publication No. 2014/0191913;
U.S. Patent Application Publication No. 2014/0197238;
U.S. Patent Application Publication No. 2014/0197239;

U.S. Patent Application Publication No. 2014/0197304;
U.S. Patent Application Publication No. 2014/0203087;
U.S. Patent Application Publication No. 2014/0204268;
U.S. Patent Application Publication No. 2014/0214631;
U.S. Patent Application Publication No. 2014/0217166;
U.S. Patent Application Publication No. 2014/0217180;
U.S. patent application Ser. No. 13/367,978 for a Laser Scanning Module Employing an Elastomeric U-Hinge Based Laser Scanning Assembly, filed Feb. 7, 2012 (Feng et al.);
U.S. patent application Ser. No. 29/436,337 for an Electronic Device, filed Nov. 5, 2012 (Fitch et al.);
U.S. patent application Ser. No. 13/771,508 for an Optical Redirection Adapter, filed Feb. 20, 2013 (Anderson);
U.S. patent application Ser. No. 13/852,097 for a System and Method for Capturing and Preserving Vehicle Event Data, filed Mar. 28, 2013 (Barker et al.);
U.S. patent application Ser. No. 13/902,110 for a System and Method for Display of Information Using a Vehicle-Mount Computer, filed May 24, 2013 (Hollifield);
U.S. patent application Ser. No. 13/902,144, for a System and Method for Display of Information Using a Vehicle-Mount Computer, filed May 24, 2013 (Chamberlin);
U.S. patent application Ser. No. 13/902,242 for a System For Providing A Continuous Communication Link With A Symbol Reading Device, filed May 24, 2013 (Smith et al.);
U.S. patent application Ser. No. 13/912,262 for a Method of Error Correction for 3D Imaging Device, filed Jun. 7, 2013 (Jovanovski et al.);
U.S. patent application Ser. No. 13/912,702 for a System and Method for Reading Code Symbols at Long Range Using Source Power Control, filed Jun. 7, 2013 (Xian et al.);
U.S. patent application Ser. No. 29/458,405 for an Electronic Device, filed Jun. 19, 2013 (Fitch et al.);
U.S. patent application Ser. No. 13/922,339 for a System and Method for Reading Code Symbols Using a Variable Field of View, filed Jun. 20, 2013 (Xian et al.);
U.S. patent application Ser. No. 13/927,398 for a Code Symbol Reading System Having Adaptive Autofocus, filed Jun. 26, 2013 (Todeschini);
U.S. patent application Ser. No. 13/930,913 for a Mobile Device Having an Improved User Interface for Reading Code Symbols, filed Jun. 28, 2013 (Gelay et al.);
U.S. patent application Ser. No. 29/459,620 for an Electronic Device Enclosure, filed Jul. 2, 2013 (London et al.);
U.S. patent application Ser. No. 29/459,681 for an Electronic Device Enclosure, filed Jul. 2, 2013 (Chaney et al.);
U.S. patent application Ser. No. 13/933,415 for an Electronic Device Case, filed Jul. 2, 2013 (London et al.);
U.S. patent application Ser. No. 29/459,785 for a Scanner and Charging Base, filed Jul. 3, 2013 (Fitch et al.);
U.S. patent application Ser. No. 29/459,823 for a Scanner, filed Jul. 3, 2013 (Zhou et al.);
U.S. patent application Ser. No. 13/947,296 for a System and Method for Selectively Reading Code Symbols, filed Jul. 22, 2013 (Rueblinger et al.);
U.S. patent application Ser. No. 13/950,544 for a Code Symbol Reading System Having Adjustable Object Detection, filed Jul. 25, 2013 (Jiang);
U.S. patent application Ser. No. 13/961,408 for a Method for Manufacturing Laser Scanners, filed Aug. 7, 2013 (Saber et al.);
U.S. patent application Ser. No. 14/018,729 for a Method for Operating a Laser Scanner, filed Sep. 5, 2013 (Feng et al.);
U.S. patent application Ser. No. 14/019,616 for a Device Having Light Source to Reduce Surface Pathogens, filed Sep. 6, 2013 (Todeschini);
U.S. patent application Ser. No. 14/023,762 for a Handheld Indicia Reader Having Locking Endcap, filed Sep. 11, 2013 (Gannon);
U.S. patent application Ser. No. 14/035,474 for Augmented-Reality Signature Capture, filed Sep. 24, 2013 (Todeschini);
U.S. patent application Ser. No. 29/468,118 for an Electronic Device Case, filed Sep. 26, 2013 (Oberpriller et al.);
U.S. patent application Ser. No. 14/055,234 for Dimensioning System, filed Oct. 16, 2013 (Fletcher);
U.S. patent application Ser. No. 14/053,314 for Indicia Reader, filed Oct. 14, 2013 (Huck);
U.S. patent application Ser. No. 14/065,768 for Hybrid System and Method for Reading Indicia, filed Oct. 29, 2013 (Meier et al.);
U.S. patent application Ser. No. 14/074,746 for Self-Checkout Shopping System, filed Nov. 8, 2013 (Hejl et al.);
U.S. patent application Ser. No. 14/074,787 for Method and System for Configuring Mobile Devices via NFC Technology, filed Nov. 8, 2013 (Smith et al.);
U.S. patent application Ser. No. 14/087,190 for Optimal Range Indicators for Bar Code Validation, filed Nov. 22, 2013 (Hejl);
U.S. patent application Ser. No. 14/094,087 for Method and System for Communicating Information in an Digital Signal, filed Dec. 2, 2013 (Peake et al.);
U.S. patent application Ser. No. 14/101,965 for High Dynamic-Range Indicia Reading System, filed Dec. 10, 2013 (Xian);
U.S. patent application Ser. No. 14/150,393 for Indicia-reader Having Unitary Construction Scanner, filed Jan. 8, 2014 (Colavito et al.);
U.S. patent application Ser. No. 14/154,207 for Laser Barcode Scanner, filed Jan. 14, 2014 (Hou et al.);
U.S. patent application Ser. No. 14/165,980 for System and Method for Measuring Irregular Objects with a Single Camera filed Jan. 28, 2014 (Li et al.);
U.S. patent application Ser. No. 14/166,103 for Indicia Reading Terminal Including Optical Filter filed Jan. 28, 2014 (Lu et al.);
U.S. patent application Ser. No. 14/200,405 for Indicia Reader for Size-Limited Applications filed Mar. 7, 2014 (Feng et al.);
U.S. patent application Ser. No. 14/231,898 for Hand-Mounted Indicia-Reading Device with Finger Motion Triggering filed Apr. 1, 2014 (Van Horn et al.);
U.S. patent application Ser. No. 14/250,923 for Reading Apparatus Having Partial Frame Operating Mode filed Apr. 11, 2014, (Deng et al.);
U.S. patent application Ser. No. 14/257,174 for Imaging Terminal Having Data Compression filed Apr. 21, 2014, (Barber et al.);
U.S. patent application Ser. No. 14/257,364 for Docking System and Method Using Near Field Communication filed Apr. 21, 2014 (Showering);
U.S. patent application Ser. No. 14/264,173 for Autofocus Lens System for Indicia Readers filed Apr. 29, 2014 (Ackley et al.);
U.S. patent application Ser. No. 14/274,858 for Mobile Printer with Optional Battery Accessory filed May 12, 2014 (Marty et al.);
U.S. patent application Ser. No. 14/277,337 for MULTI-PURPOSE OPTICAL READER, filed May 14, 2014 (Jovanovski et al.);

U.S. patent application Ser. No. 14/283,282 for TERMINAL HAVING ILLUMINATION AND FOCUS CONTROL filed May 21, 2014 (Liu et al.);

U.S. patent application Ser. No. 14/300,276 for METHOD AND SYSTEM FOR CONSIDERING INFORMATION ABOUT AN EXPECTED RESPONSE WHEN PERFORMING SPEECH RECOGNITION, filed Jun. 10, 2014 (Braho et al.);

U.S. patent application Ser. No. 14/305,153 for INDICIA READING SYSTEM EMPLOYING DIGITAL GAIN CONTROL filed Jun. 16, 2014 (Xian et al.);

U.S. patent application Ser. No. 14/310,226 for AUTOFOCUSING OPTICAL IMAGING DEVICE filed Jun. 20, 2014 (Koziol et al.);

U.S. patent application Ser. No. 14/327,722 for CUSTOMER FACING IMAGING SYSTEMS AND METHODS FOR OBTAINING IMAGES filed Jul. 10, 2014 (Oberpriller et al);

U.S. patent application Ser. No. 14/327,827 for a MOBILE-PHONE ADAPTER FOR ELECTRONIC TRANSACTIONS, filed Jul. 10, 2014 (Hejl);

U.S. patent application Ser. No. 14/329,303 for CELL PHONE READING MODE USING IMAGE TIMER filed Jul. 11, 2014 (Coyle);

U.S. patent application Ser. No. 14/333,588 for SYMBOL READING SYSTEM WITH INTEGRATED SCALE BASE filed Jul. 17, 2014 (Barten);

U.S. patent application Ser. No. 14/334,934 for a SYSTEM AND METHOD FOR INDICIA VERIFICATION, filed Jul. 18, 2014 (Hejl);

U.S. patent application Ser. No. 14/336,188 for METHOD OF AND SYSTEM FOR DETECTING OBJECT WEIGHING INTERFERENCES, Filed Jul. 21, 2014 (Amundsen et al.);

U.S. patent application Ser. No. 14/339,708 for LASER SCANNING CODE SYMBOL READING SYSTEM, filed Jul. 24, 2014 (Xian et al.);

U.S. patent application Ser. No. 14/340,627 for an AXIALLY REINFORCED FLEXIBLE SCAN ELEMENT, filed Jul. 25, 2014 (Rueblinger et al.);

U.S. patent application Ser. No. 14/340,716 for an OPTICAL IMAGER AND METHOD FOR CORRELATING A MEDICATION PACKAGE WITH A PATIENT, filed Jul. 25, 2014 (Ellis);

U.S. patent application Ser. No. 14/342,544 for Imaging Based Barcode Scanner Engine with Multiple Elements Supported on a Common Printed Circuit Board filed Mar. 4, 2014 (Liu et al.);

U.S. patent application Ser. No. 14/345,735 for Optical Indicia Reading Terminal with Combined Illumination filed Mar. 19, 2014 (Ouyang);

U.S. patent application Ser. No. 14/336,188 for METHOD OF AND SYSTEM FOR DETECTING OBJECT WEIGHING INTERFERENCES, Filed Jul. 21, 2014 (Amundsen et al.);

U.S. patent application Ser. No. 14/355,613 for Optical Indicia Reading Terminal with Color Image Sensor filed May 1, 2014 (Lu et al.);

U.S. patent application Ser. No. 14/370,237 for WEB-BASED SCAN-TASK ENABLED SYSTEM AND METHOD OF AND APPARATUS FOR DEVELOPING AND DEPLOYING THE SAME ON A CLIENT-SERVER NETWORK filed Jul. 2, 2014 (Chen et al.);

U.S. patent application Ser. No. 14/370,267 for INDUSTRIAL DESIGN FOR CONSUMER DEVICE BASED SCANNING AND MOBILITY, filed Jul. 2, 2014 (Ma et al.);

U.S. patent application Ser. No. 14/376,472, for an ENCODED INFORMATION READING TERMINAL INCLUDING HTTP SERVER, filed Aug. 4, 2014 (Lu);

U.S. patent application Ser. No. 14/379,057 for METHOD OF USING CAMERA SENSOR INTERFACE TO TRANSFER MULTIPLE CHANNELS OF SCAN DATA USING AN IMAGE FORMAT filed Aug. 15, 2014 (Wang et al.);

U.S. patent application Ser. No. 14/452,697 for INTERACTIVE INDICIA READER, filed Aug. 6, 2014 (Todeschini);

U.S. patent application Ser. No. 14/453,019 for DIMENSIONING SYSTEM WITH GUIDED ALIGNMENT, filed Aug. 6, 2014 (Li et al.);

U.S. patent application Ser. No. 14/460,387 for APPARATUS FOR DISPLAYING BAR CODES FROM LIGHT EMITTING DISPLAY SURFACES filed Aug. 15, 2014 (Van Horn et al.);

U.S. patent application Ser. No. 14/460,829 for ENCODED INFORMATION READING TERMINAL WITH WIRELESS PATH SELECTION CAPABILITY, filed Aug. 15, 2014 (Wang et al.);

U.S. patent application Ser. No. 14/462,801 for MOBILE COMPUTING DEVICE WITH DATA COGNITION SOFTWARE, filed on Aug. 19, 2014 (Todeschini et al.);

U.S. patent application Ser. No. 14/446,387 for INDICIA READING TERMINAL PROCESSING PLURALITY OF FRAMES OF IMAGE DATA RESPONSIVELY TO TRIGGER SIGNAL ACTIVATION filed Jul. 30, 2014 (Wang et al.);

U.S. patent application Ser. No. 14/446,391 for MULTIFUNCTION POINT OF SALE APPARATUS WITH OPTICAL SIGNATURE CAPTURE filed Jul. 30, 2014 (Good et al.);

U.S. patent application Ser. No. 29/486,759 for an Imaging Terminal, filed Apr. 2, 2014 (Oberpriller et al.);

U.S. patent application Ser. No. 29/492,903 for an INDICIA SCANNER, filed Jun. 4, 2014 (Zhou et al.); and U.S. patent application Ser. No. 29/494,725 for an IN-COUNTER BARCODE SCANNER, filed Jun. 24, 2014 (Oberpriller et al.).

In the specification and/or figures, typical embodiments of the invention have been disclosed. The present invention is not limited to such exemplary embodiments. The use of the term "and/or" includes any and all combinations of one or more of the associated listed items. The figures are schematic representations and so are not necessarily drawn to scale. Unless otherwise noted, specific terms have been used in a generic and descriptive sense and not for purposes of limitation.

The invention claimed is:
1. A wireless device, comprising:
a WiFi transceiver;
a wireless wide area network (WWAN) transceiver;
a programmed processor, communicatively coupled to the WiFi transceiver and the WWAN transceiver, the processor being configured for:
connecting the WiFi transceiver to a WiFi access point;
while the WiFi transceiver is connected to the WiFi access point, operating in a learning mode in which a plurality of WWAN cells are characterized at a location of the WiFi access point, each of the plurality stored as a table entry in an access point characterization table, the table entry for each of the plurality of WWAN cells comprising a minimum signal strength value and a maximum signal strength value;

determining that the connection with the WiFi access point has been lost;
upon determining that the connection with the WiFi access point has been lost, operating in a monitoring mode, in which WWAN signals are compared to the table entries stored in the access point characterization table, and in which the WiFi transceiver is disabled;
determining that the WWAN signals from at least some of the WWAN cells match the WiFi access point characterization table, the match comprising detecting a transmission from a WWAN cell that has a signal strength value between the minimum signal strength value and the maximum signal strength value in the respective table entry for the WWAN cell; and
upon determining that the WWAN signals from at least some of the WWAN cells match the WiFi access point characterization, enabling the WiFi transceiver and reconnecting to the WiFi access point.

2. The wireless device according to claim 1, where the WiFi access point characterization table comprises table entries for each WWAN cell detected while the WiFi transceiver is connected to the WiFi access point in the learning mode.

3. The wireless device according to claim 1, where the processor is further configured to, while in learning mode, monitor the signal strength for each WWAN cell that has a table entry in the access point characterization table and to update the minimum signal strength value when the signal strength detected is less than the minimum signal strength value stored in the table and to update the maximum signal strength value when the signal strength detected is greater than the maximum signal strength value stored in the table.

4. The wireless device according to claim 1, where the processor is configured for determining that the WWAN signals from all of the WWAN cells match the WiFi access point characterization table.

5. The wireless device according to claim 1, where the table is one of a plurality of tables in a database of tables, with each table being associated with a single WiFi access point.

6. The wireless device according to claim 1, where the processor is further programmed to detect a transmission from a new WWAN cell that does not appear in the WiFi access point characterization table for an access point to which the WiFi transceiver is connected; and to create a table entry for the new WWAN cell that stores the new WWAN cell's minimum and maximum signal strength values.

7. A method, carried out at a WiFi and WWAN capable device, comprising:
connecting a WiFi transceiver to a WiFi access point;
while the WiFi transceiver is connected to the WiFi access point, operating the device in a learning mode in which a plurality of WWAN cells are characterized at a location of the WiFi access point, each of the plurality stored as a table entry in a WiFi access point characterization table, the table entry for each of the plurality of WWAN cells comprising a minimum signal strength value and a maximum signal strength value;
determining that the WiFi transceiver has lost connection with the WiFi access point;
upon determining that the WiFi transceiver has lost connection with the WiFi access point, operating the device in a monitoring mode, in which WWAN signals are compared to the table entries stored in the WiFi access point characterization table, and in which the WiFi transceiver is disabled;
determining that the WWAN signals from at least some of the WWAN cells match the WiFi access point characterization table, the match comprising detecting a transmission from a WWAN cell that has a signal strength value between the minimum signal strength value and the maximum signal strength value in the respective table entry for the WWAN cell; and
upon determining that the WWAN signals from at least some of the WWAN cells match the WiFi access point characterization, enabling the WiFi transceiver and connecting to the WiFi access point.

8. The method according to claim 7, where the WiFi access point characterization table comprises table entries for each WWAN cell detected while the WiFi transceiver is connected to the WiFi access point in the learning mode.

9. The method according to claim 7, further comprising the processor, while in learning mode, monitoring the signal strength for each WWAN cell that has a table entry in the access point characterization table and to update the minimum signal strength value when the signal strength detected is less than the minimum signal strength value stored in the table and to update the maximum signal strength value when the signal strength detected is greater than the maximum signal strength value stored in the table.

10. The method according to claim 7, comprising determining that the WWAN signals from all of the WWAN cells match the WiFi access point characterization.

11. The method according to claim 7, where the table is one of a plurality of tables in a database of tables, with each table being associated with a single WiFi access point.

12. The method according to claim 7, further comprising: detecting a transmission from a new WWAN cell that does not appear in the WiFi access point characterization table for an access point to which the WiFi transceiver is connected; and creating a table entry for the new WWAN cell that stores the new WWAN cell's minimum and maximum signal strength values.

13. A non-transitory computer readable storage device storing instructions that when executed by one or more programmed processors, carries out a process comprising:
connecting a WiFi transceiver of a wireless device to a WiFi access point;
while the WiFi transceiver is connected to the WiFi access point, operating the wireless device in a learning mode in which a plurality of WWAN cells are characterized at a location of the WiFi access point, each of the plurality stored as a table entry in a WiFi access point characterization table, the table entry for each of the plurality of WWAN cells comprising a minimum signal strength value and a maximum signal strength value;
determining that the WiFi transceiver has lost connection with the WiFi access point;
upon determining that the WiFi transceiver has lost connection with the WiFi access point, operating the wireless device in a monitoring mode, in which WWAN signals are compared to the table entries stored in the WiFi access point characterization table, and in which the WiFi transceiver is disabled;
determining that the WWAN signals from at least some of the WWAN cells match the WiFi access point characterization table, the match comprising detecting a transmission from a WWAN cell that has a signal strength value between the minimum signal strength value and the maximum signal strength value in the respective table entry for the WWAN cell; and
upon determining that the WWAN signals from at least some of the WWAN cells match the WiFi access point characterization, enabling the WiFi transceiver and connecting to the WiFi access point.

14. The storage device according to claim 13, where the WiFi access point characterization table comprises table entries for each WWAN cell detected while the WiFi transceiver is connected to the WiFi access point in the learning mode.

15. The storage device according to claim 13, further comprising the processor, while in learning mode, monitoring the signal strength for each WWAN cell that has a table entry in the access point characterization table and to update the minimum signal strength value when the signal strength detected is less than the minimum signal strength value stored in the table and to update the maximum signal strength value when the signal strength detected is greater than the maximum signal strength value stored in the table.

16. The storage device according to claim 13, where the processor is configured for determining that the WWAN signals from all of the WWAN cells match the WiFi access point characterization table.

17. The storage device according to claim 13, where the table is one of a plurality of tables in a database of tables, with each table being associated with a single WiFi access point.

18. The storage device according to claim 13, where the processor is further programmed to detect a transmission from a new WWAN cell that does not appear in the WiFi access point characterization table; and to create a table entry for the new WWAN cell that stores the new WWAN cell's minimum and maximum signal strength values.

* * * * *